United States Patent [19]

Izukawa

[11] Patent Number: 5,416,545
[45] Date of Patent: May 16, 1995

[54] MAGNETIC RECORDING-REPRODUCING CIRCUIT IN A CAMERA

[75] Inventor: Kazuhiro Izukawa, Misato, Japan

[73] Assignee: Canon Kabushiki Kaisha, Tokyo, Japan

[21] Appl. No.: 928,112

[22] Filed: Aug. 11, 1992

[30] Foreign Application Priority Data

Aug. 15, 1991 [JP] Japan ................................. 3-228505
Oct. 15, 1991 [JP] Japan ................................. 3-293838
Oct. 18, 1991 [JP] Japan ................................. 3-297606
Oct. 18, 1991 [JP] Japan ................................. 3-297607

[51] Int. Cl.⁶ ............................................. G03B 17/24
[52] U.S. Cl. ..................................................... 354/105
[58] Field of Search ................... 354/105, 106; 360/55, 360/67

[56] References Cited

U.S. PATENT DOCUMENTS 4,403,264  9/1983  Watatani et al. .................. 360/33.1
4,851,935  7/1989  Ohyama et al. ....................... 360/64
4,964,139  10/1990  Wash et al. ............................ 375/23
5,155,511  10/1992  Tamamura ............................. 354/76
5,191,435  3/1993  Tsunerawa et al. ................. 358/335

OTHER PUBLICATIONS

Okamura, "The Design of OP Amplifying Circuits," CQ Publishing Co., Ltd., pp. 128 and 129.

Primary Examiner—M. L. Gellner
Assistant Examiner—Nicholas J. Tuccillo
Attorney, Agent, or Firm—Fitzpatrick, Cella, Harper & Scinto

[57] ABSTRACT

A magnetic recording-reproducing circuit in a camera includes a magnetic head for reproducing information recorded on a magnetic recording portion, a first amplifying circuit having at least two input ends, the output of the magnetic head being connected to one of the input ends of the first amplifying circuit, a second amplifying circuit having at least two input ends, the output of the magnetic head being connected to one of the input ends of the second amplifying circuit, a first impedance for connecting the other input end of the first amplifying circuit and the other input end of the second amplifying circuit together, a second impedance for connecting the other input end and the output end of the first amplifying circuit together, and a third impedance for connecting the other input end and the output end of the second amplifying circuit together. The circuit also includes first and second comparison circuits and a binarization circuit for binarizing information recorded on the film on the basis of outputs of the first and second comparison circuits.

21 Claims, 19 Drawing Sheets

FIG. 5B R 
FIG. 5C S 
FIG. 5D Q 

MAGNETIC RECORDING-REPRODUCING CIRCUIT IN A CAMERA

BACKGROUND OF THE INVENTION

1. Field of the Invention

This invention relates to a camera provided with means for effecting magnetic recording and reproduction on film having a magnetic recording portion which is inserted in the camera.

2. Related Background Art

Heretofore, a reading circuit for effecting reproduction on a magnetic recording medium by the use of a magnetic head has been constructed as shown in FIG. 25 of the accompanying drawings. The reference numeral 601 designates a magnetic head, the reference numeral 602 denotes a differential amplifier for amplifying the output of the magnetic head 601, and the reference numerals 603, 604, 605, 606 and 607 designate resistors. The reference numerals 608 and 609 denote comparators connected to the differential amplifier 602, and the reference numeral 610 designates an RS flip-flop connected to the comparators 608 and 609.

The resistors 603, 604, 605, 606 and 607 supply the input bias current of the differential amplifier 602. The resistor 607 is a gain setting resistor. When the value of the resistor 607 is determined, the differential voltage gain is determined as shown in FIG. 27 of the accompanying drawings, and the reproducing signal output of the magnetic head 601 conforming to the voltage amplification degree thereof is output.

FIG. 26 of the accompanying drawings diagrammatically shows an amplifying circuit for amplifying the reproducing signal of the magnetic head. In the circuit of FIG. 26, the gain setting resistor 607 is connected to terminals (b) and (g), and the output of the magnetic head 601 is connected to terminals (a) and (h). Tr1–Tr13 designate transistors. When a potential difference occurs between terminals (a) and (g), a difference occurs between electric currents flowing to the transistors Tr1 and Tr2. The current difference is converted into a potential difference by the transistors Tr3–Tr6 which constitute the feedback circuit of the subsequent stage. The conversion rate of the current difference and the potential difference is varied by the value of the resistor 607. Accordingly, when the value of the resistor 607 is determined, the differential voltage gain is determined as shown in FIG. 27, and the reproducing signal output of the magnetic head conforming to the voltage amplification degree thereof is output.

In the above-described prior art, however, as shown in FIG. 27, the amplification degree is changed by a variation in the value of the resistor 607 by a temperature change or the like and therefore, the amplitude of a noise voltage applied to the comparators 608 and 609 varies, and when that amplitude becomes great, the comparators 608 and 609 are operated by the noise voltage, and this has led to the disadvantage that a wrong signal is output from the RS flip-flop circuit 610. Also, when the differential voltage gain is amplified to a frequency higher than the signal frequency from the magnetic head, it becomes a high frequency noise, and this has sometimes led to the aggravation of the signal to noise ratio.

SUMMARY OF THE INVENTION

One aspect of the invention is that in a magnetic recording-reproducing circuit in a camera which can be loaded with film formed with a magnetic recording portion and which reproduces information recorded on said magnetic recording portion by a magnetic head, provision is made of two operational amplifiers to the positive phase inputs of which the output of said magnetic head is applied and the section between the opposite phase inputs of which is connected by a first resistor and the sections between the outputs and opposite phase inputs of which are connected by second and third resistors, and according to this construction, the output of the magnetic head is applied to the positive phase inputs of the two operational amplifiers and a bias current is supplied thereto through the magnetic head, and the opposite phase inputs are connected in common through a resistor, and the amplifiers constructed in this manner have their amplification degrees determined by only the resistance ratio. Thus, any variation in the amplification degree by a temperature change or the like is eliminated and a stable output voltage is obtained.

Further, one aspect of the invention is that provision is made of means for limiting the frequency characteristic of the amplification degree of the operational amplifying circuit in the magnetic recording-reproducing circuit of the above-described construction to a band in which an input signal is created, whereby the signal to noise ratio of the circuit can be improved.

Furthermore, one aspect of the invention is that in a magnetic recording-reproducing circuit in a camera having a magnetic head for reproducing information recorded on a magnetic recording portion and an amplifying circuit for amplifying the output of said magnetic head, the output terminal of said amplifying circuit is connected to a low-pass filter, whereby it becomes possible to decrease the noise voltage of the circuit.

BRIEF DESCRIPTION OF THE DRAWINGS

FIGS. 5A to 5F are timing charts showing the operation of the first embodiment of the present invention.

DESCRIPTION OF THE PREFERRED EMBODIMENTS

A first embodiment of the present invention will hereinafter be described with reference to the drawings.

Figure 1:
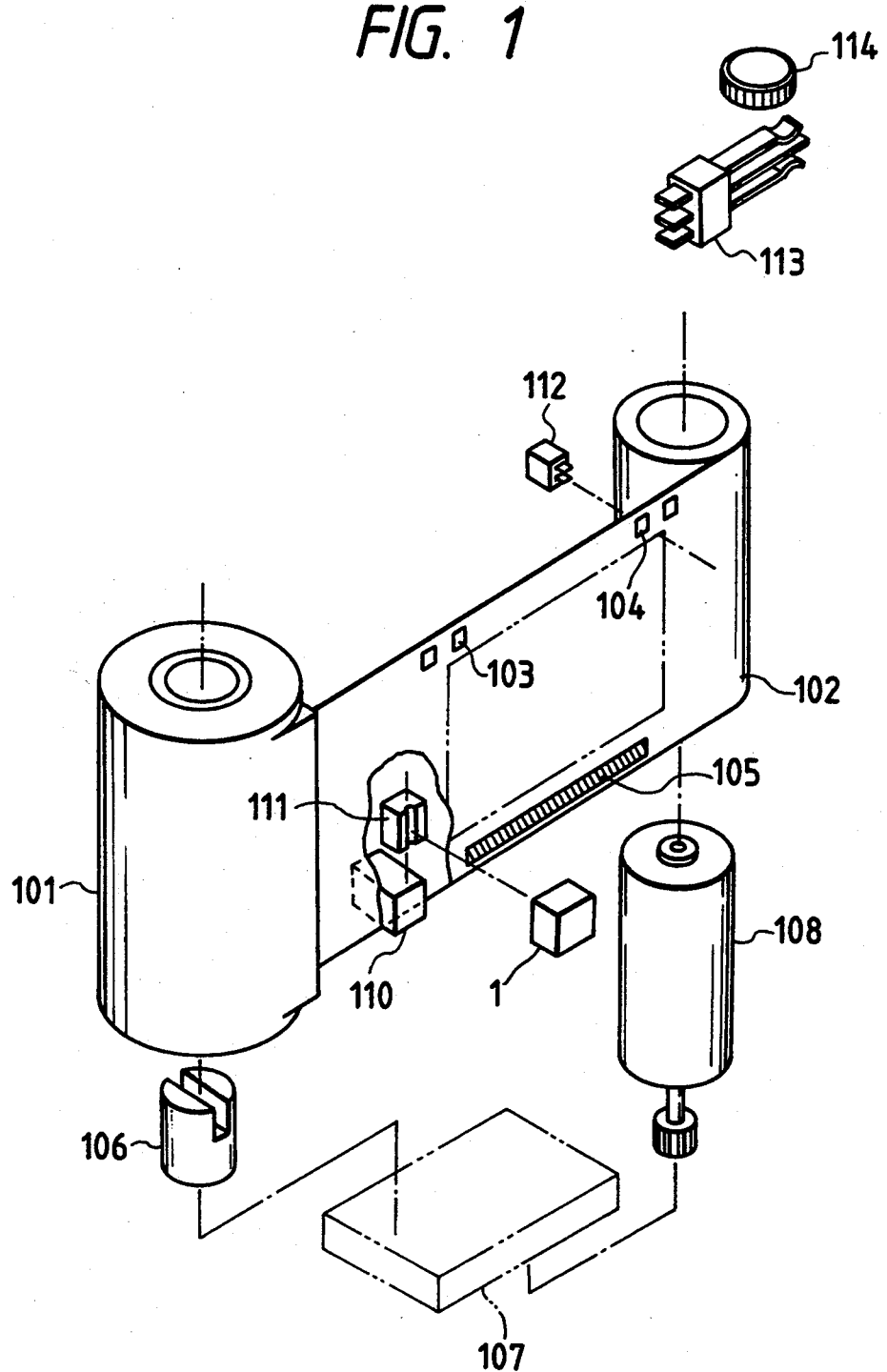
FIG. 1 is a perspective view showing the magnetic recording-reproducing mechanism portion of a camera according to a first embodiment of the present invention.
Figure 2:
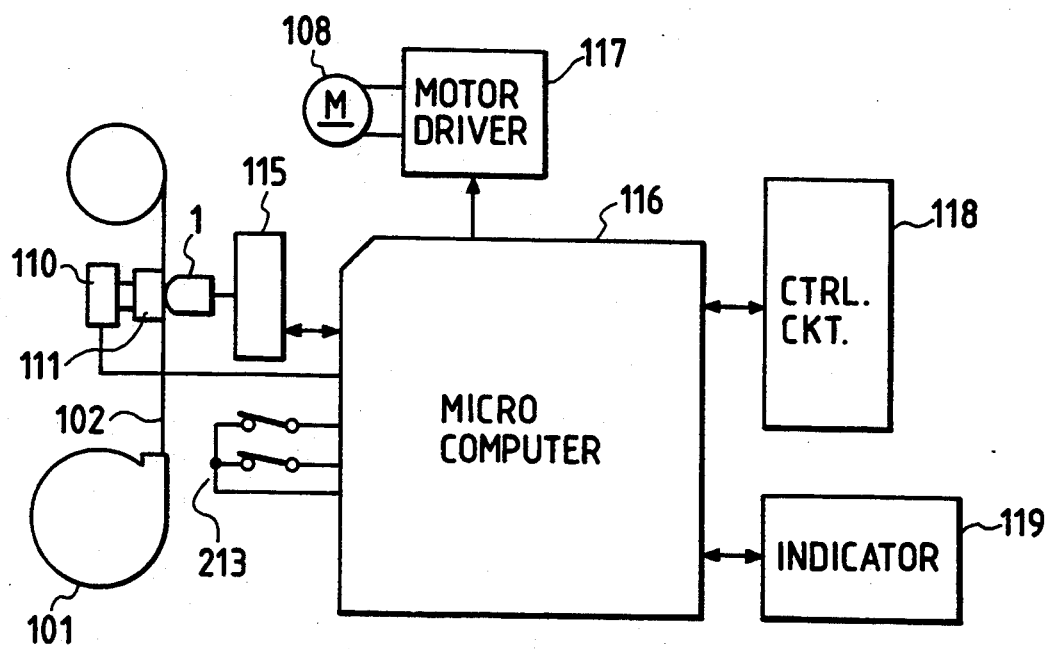
FIG. 2 is a block diagram showing the electrical system of the magnetic recording-reproducing mechanism of the camera according to the first embodiment of the present invention.
Figure 3:
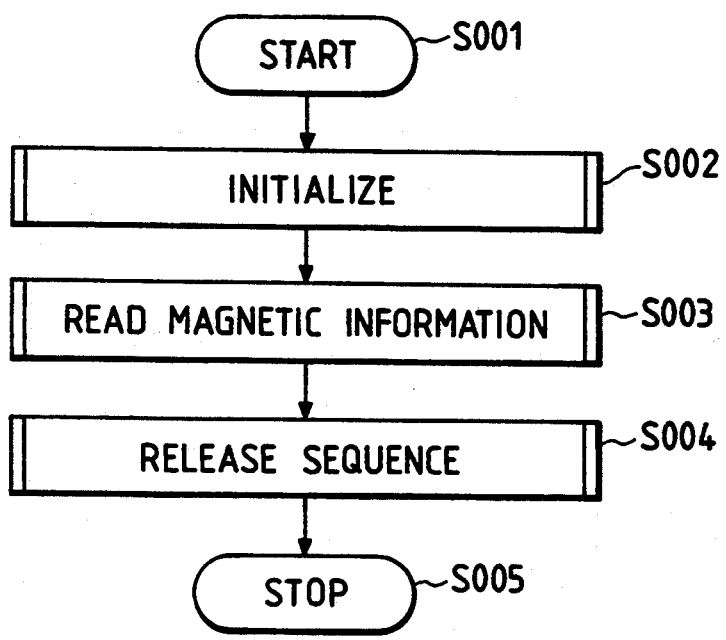
FIG. 3 is a flow chart showing the processing operation of the microcomputer of FIG. 2.
Figure 4:
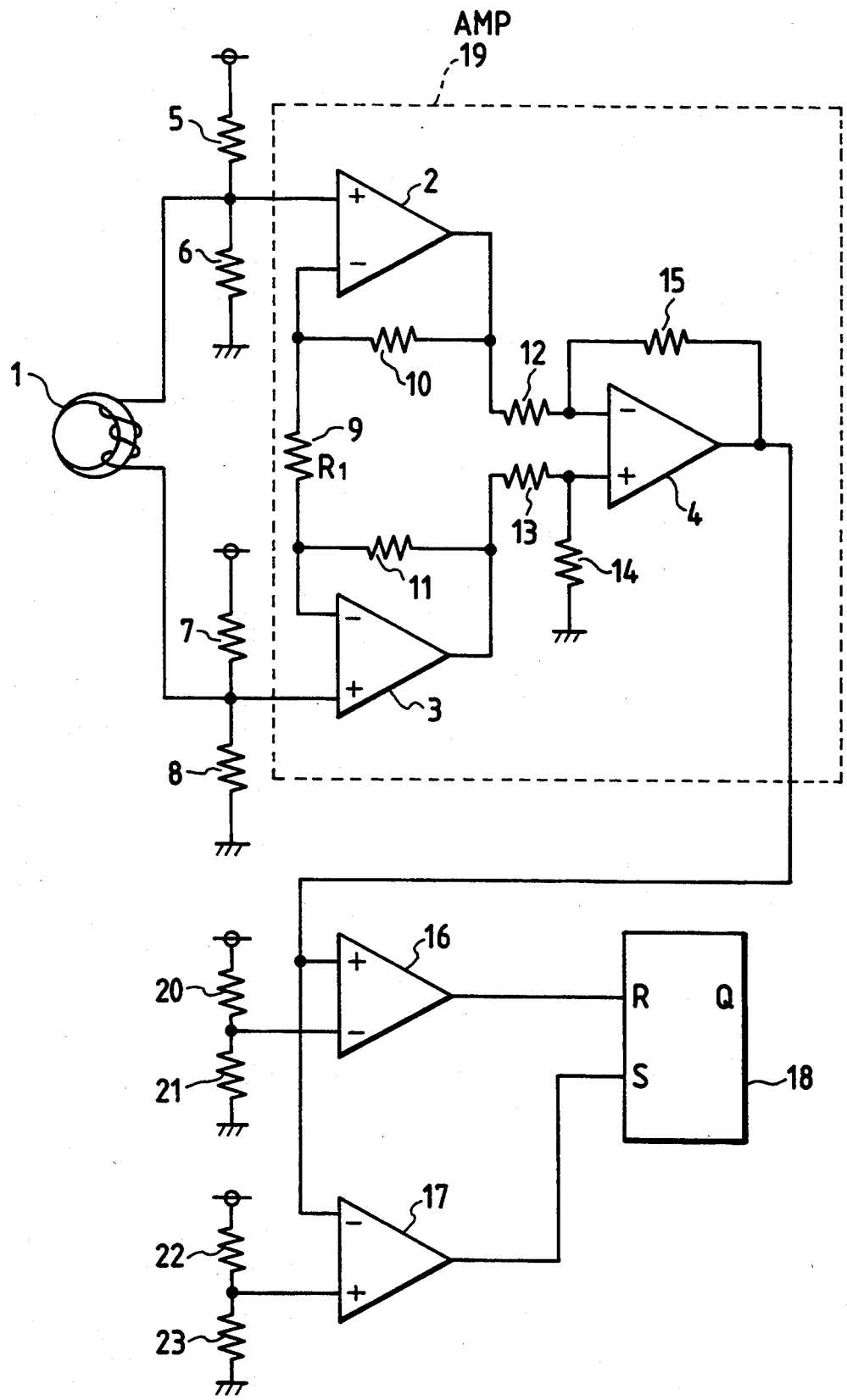
FIG. 4 diagrammatically shows an amplifying circuit according to the first embodiment of the present invention.

FIG. 1 is a perspective view showing the mechanism portion of a camera according to the present invention, FIG. 2 is a block diagram showing an electrical system belonging to the camera of FIG. 1, FIG. 3 is a flow chart showing an example of the processing by the microcomputer of FIG. 2, and FIG. 4 is a circuit diagram of an amplifying circuit used in the camera according to the present invention.

Description will first be made of the mechanism of the entire camera. In FIG. 1, the reference numeral 101 designates a film cartridge, the reference numeral 102 denotes film, the reference numerals 103 and 104 designate perforations formed at predetermined intervals in one side edge of the film 102, the reference numeral 105 denotes a magnetic track, the reference numeral 106 designates a film feeding fork, the reference numeral 107 denotes a film feeding gear unit, the reference numeral 108 designates a film feeding motor, the reference numeral 1 denotes a magnetic head, the reference numeral 110 designates a pad keeping unit, the reference numeral 111 denotes a keeping pad, the reference numeral 112 designates a perforation detecting photoreflector, the reference numeral 113 denotes a release switch, and the reference numeral 114 designates a release switch button.

The operation in FIG. 1 will be described briefly. When the film cartridge 101 is inserted into the camera and with the leading end of the film therein being taken up onto a take-up shaft, the release switch button 114 is depressed, the release switch 113 becomes closed and the film feeding motor 108 starts rotation, and with the rotation as a drive source, the film 102 is taken up. In the process of this taking-up of the film 102, by the driving of the pad keeping unit 110, the rotation keeping pad 111 urges the film 102 against a magnetic head 1, whereby the content of the magnetic track 105 is read by the magnetic head 1.

Next, in FIG. 2, the reference numeral 115 denotes a magnetic recording-reproducing circuit for amplifying the output of the magnetic head 1 or applying recording information to the magnetic head 1, the reference numeral 116 designates a microcomputer for executing the process shown in FIG. 3, the reference numeral 117 denotes a motor driving circuit for driving the film feeding motor 108, the reference numeral 118 designates a control circuit for controlling various members under the control of the microcomputer 116, and the reference numeral 119 denotes an indicating circuit for effecting various indications. The other members are the same as shown in FIG. 1 and therefore need not be described.

FIG. 3 is a flow chart showing a main program executed by the microcomputer 116.

The operation is first started (S001), and the keeping pad 111 is separated from the film 102 by the pad keeping unit 110. A lens (not shown) is moved to its initial position by the control circuit 118 (S002). Subsequently, in order to read magnetic information on the film 102, the keeping pad 111 is urged against the film 102 by the pad keeping unit 110 and the film 102 is moved relative to the magnetic head 1 by the film feeding motor 108. Thereby the output of the magnetic head 1 is amplified by the magnetic recording-reproducing circuit 115 and is digitalized and read (S003). Then, as in the camera according to the prior art, when the release switch 113 is closed, the lens is moved to a predetermined position by auto focus and the shutter speed and aperture are determined by automatic aperture and the shutter is opened (S004). The operation is then terminated (S005).

The circuit of FIG. 4 will now be described. This circuit is an amplifying circuit portion in the magnetic recording-reproducing circuit 115. In FIG. 4, the same members as those in FIGS. 2 and 3 are given the same reference numerals and therefore need not be described. The reference numerals 2, 3 and 4 designate operational amplifiers (hereinafter referred to as OP amplifiers) for amplifying the output of the magnetic head 1, the reference numerals 5-15 denote resistors for forming each of the OP amplifiers 2-4 as a predetermined amplifying circuit, the reference numerals 16 and 17 designate comparators connected to the OP amplifier 4, and the reference numeral 18 denotes an RS flip-flop connected to the outputs of the comparators 16 and 17. The reference numerals 20-23 designate resistors for imparting a voltage to each of the comparators 16 and 17 at a predetermined bias. The details of a differential amplifying circuit AMP 19 within the broken line constituted by the OP amplifiers 2-4 and resistors 9-15 within the broken line are described, for example, in *The Design of OP Amplifying Circuits*, pp. 128-130, written by Michio Okamura and published by CQ Publishing Co., Ltd.

The amplification degree of this differential amplifying circuit AMP is expressed as follows:

$$(1+2R_{10}/R_9) \cdot R_{15}/R_{12},$$

where $R_{10}$ is the resistance value of the resistor 10 (a second resistor), $R_9$ is the resistance value of the resistor 9 (a first resistor), $R_{12}$ is the resistance value of the resistor 12 (a third resistor), $R_{15}$ is the resistance value of the resistor 15, and $R_{12}$ is the resistance value of the resistor 12. Also, by making $R_{10}=R_{11}$, $R_{12}=R_{13}$ and $R_{14}=R_{15}$, the differential amplifying circuit AMP operates by an amplification degree determined by the ratio between the resistance values. The resistors 5–8 are bias resistors for imparting a predetermined bias to the positive phase inputs of the OP amplifiers 2 and 3.

It is desired here that as the input means of the amplifying circuit of the magnetic head 1 which outputs a minute signal voltage, use be made of an OP amplifier using an FET (field effect transistor) or a super $\beta$ transistor in the input stage of the OP amplifiers 2 and 3 in which the bias current is small. As such, there is, for example, TL071 produced by Texas Instruments (TI), Inc. In accordance with this, it is desirable that resistors of high resistance values be used as the resistors 5–8.

The comparators 16 and 17 each are constructed by the use, for example, of LM2903 produced by TI, Inc. The comparators 16 and 17 use voltages divided by the resistors 20, 21, 22 and 23 as reference voltages and compares them with the output voltage of the differential amplifying circuit AMP 19, and outputs the result of this comparison to the RS flip-flop 18 (for example, 74279 produced by TI, Inc.).

Figure 5A:
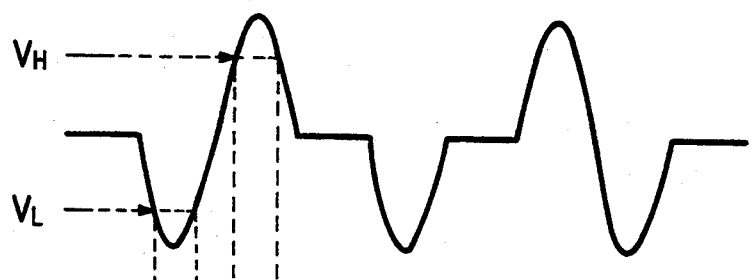
Figure 5E:
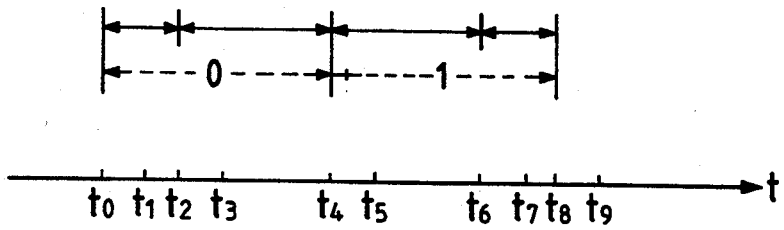

The recording signal input to the magnetic head 1 is a PPM signal as shown in U.S. Pat. No. 4,964,139, and when this signal is amplified by the differential amplifying circuit AMP 19, it assumes a voltage waveform as shown in FIG. 5A. When the voltage divided by the resistors 20 and 21 is $V_H$ and the voltage divided by the resistors 22 and 23 is $V_L$, the output waveforms of the comparators 16 and 17 become such as shown in FIGS. 5B and 5C, respectively. Also, the output of the RS flip-flop 18 becomes such as shown in FIG. 5D, i.e., the RS flip-flop 18 functions as a binarization circuit for binarizing the recorded signal on the film 102 in accordance with the outputs of the two comparators 16 and 17. Consequently, as shown in FIG. 5E, a signal of 0 level by the PPM signal is output during a time $t_0$ to a time $t_4$, and a signal of 1 level is output during the/time $t_4$ to a time $t_8$. The decoding of these signals is accomplished by the use of the method shown in U.S. Pat. No. 4,964,139.

Figure 5F:
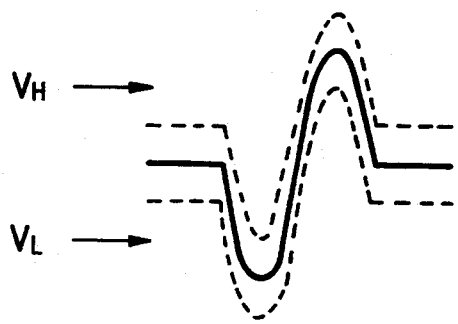

In the construction of FIG. 4, only a minute output appears in the magnetic head 1. In contrast, the creation of heat noise and the mixing of disturbance noise take place from the magnetic head 1. In the present invention, the amplification degree is known and therefore, the maximum crest value of a noise voltage can be foreseen. FIG. 5F shows the maximum crest value of the noise voltage and the situation of the PPM signal. In FIG. 5F, the waveforms indicated by broken lines show the envelopes of the maximum crest value of the noise voltage. The solid line indicates the PPM signal shown in FIG. 5A. Consequently, to find the values of $V_H$ and $V_L$, it is necessary that the maximum crest value of the noise voltage be known.

Figure 6:
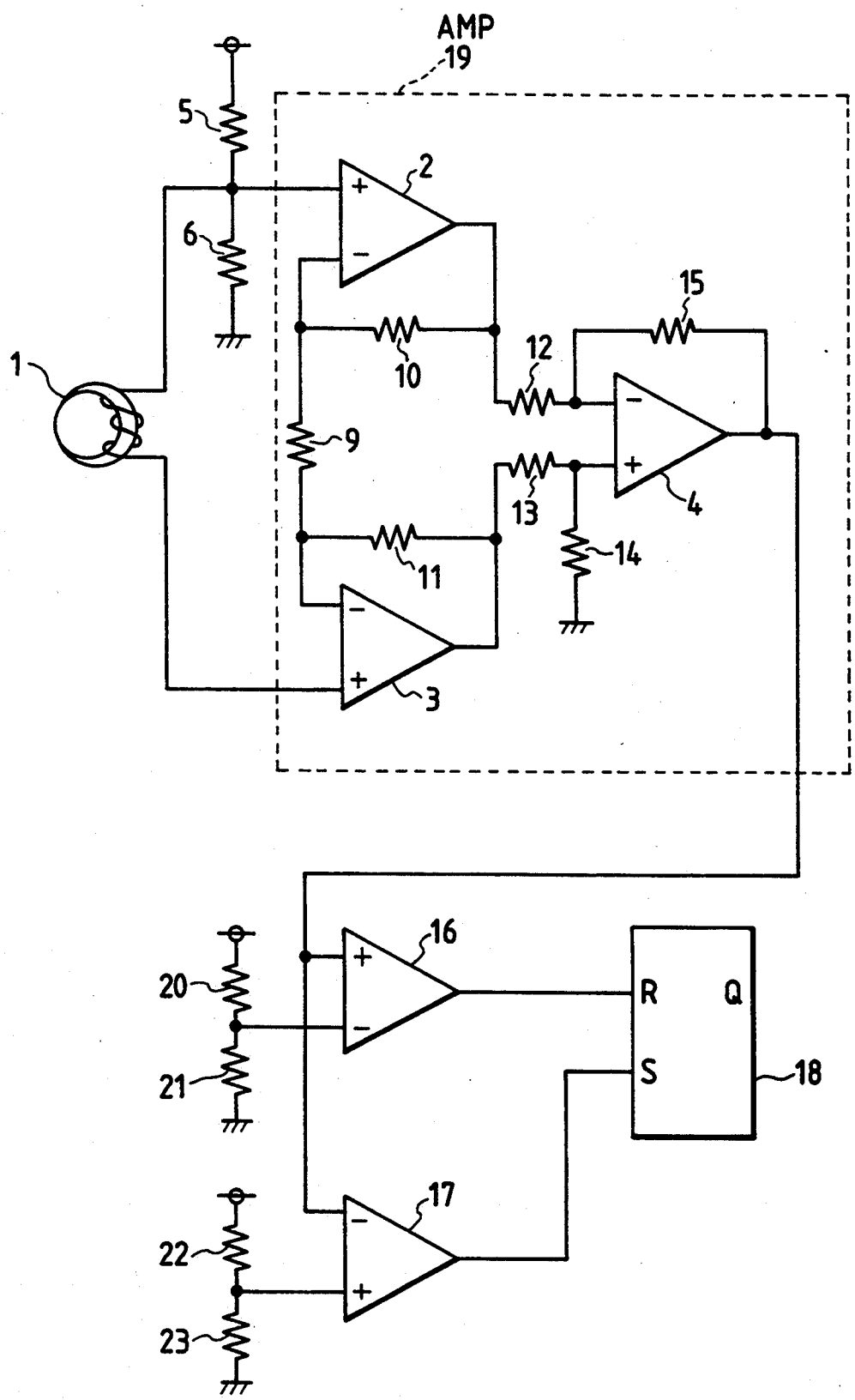
FIG. 6 is a circuit diagram showing a second embodiment of the present invention.

FIG. 6 is a circuit diagram showing a second embodiment of the present invention. The difference of the present embodiment from the above-described embodiment is that in FIG. 4, the bias resistors 7 and 8 for the OP amplifier 3 are eliminated. With such a construction, the bias current $I_{Bias}$ of the OP amplifier 3 is supplied from the resistors 5 and 6 through the magnetic head 1. Since the electric current created by the reproducing signal of the magnetic head 1 is greater than the bias current $I_{Bias}$, there arises no problem. The circuit construction like that of this embodiment wherein the bias current is supplied through the magnetic head is also seen in IC and LM1897 produced by National Semiconductor, Inc. The present embodiment, however, differs from them in that an electric current is supplied to two OP amplifiers.

Figure 7:
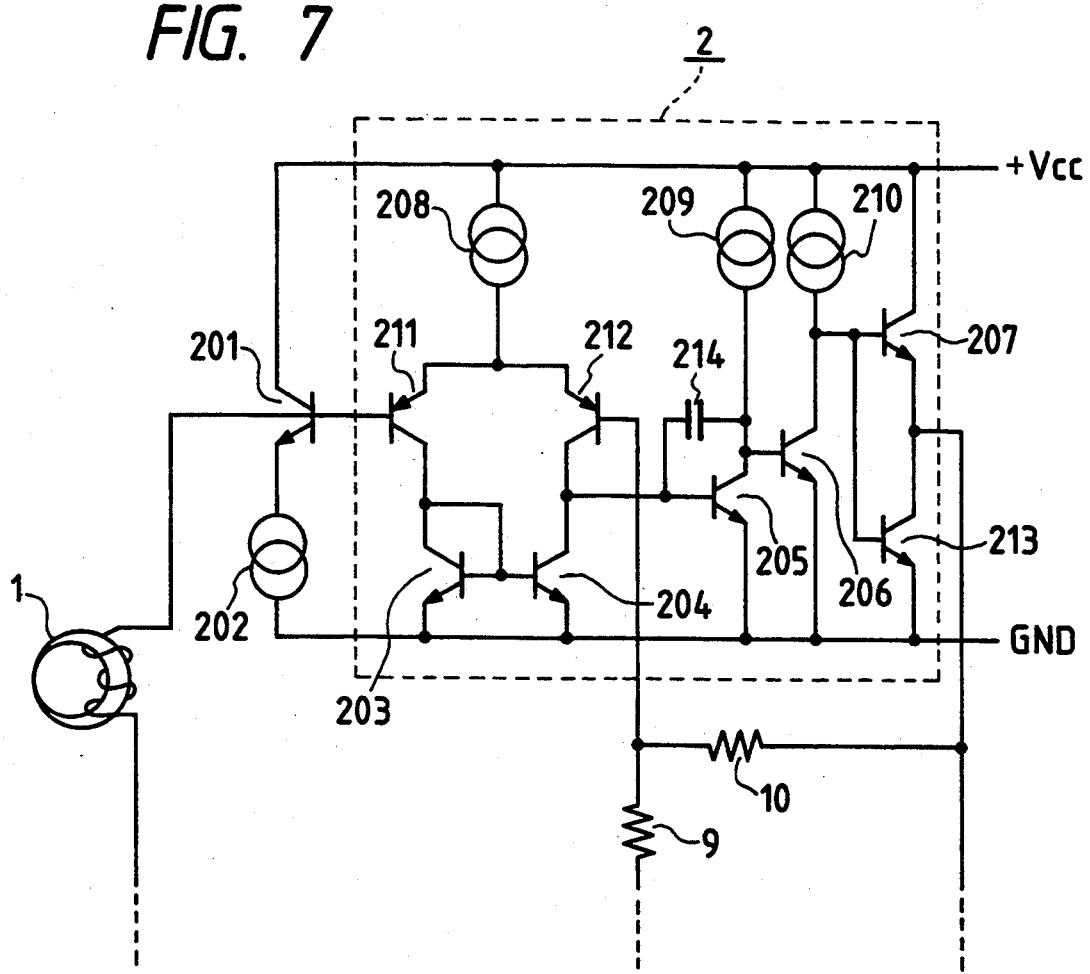
FIG. 7 is a circuit diagram showing an internal equivalent circuit in an amplifying circuit according to a third embodiment of the present invention.

FIG. 7 is a circuit diagram showing a third embodiment of the present invention. Here is shown only the construction around the OP amplifier 2 in the first embodiment of FIG. 4. In FIG. 4, the supply of the bias current to the OP amplifier 2 is effected by the use of the resistors 5 and 6, but the present embodiment is characterized in that the bias current is supplied by an NPN transistor 201 and a constant current circuit 202. In this construction, a PNP transistor 211 is used in the input stage of the OP amplifier 2 and therefore, the bias current is in the source direction as viewed from the OP amplifier 2 and thus, that current is sunk by the NPN transistor 201. The reference numerals 203, 204, 205, 206 and 207 designate NPN transistors, the reference numerals 208, 209 and 210 denote constant current sources, and the reference numerals 211, 212 and 213 designate PNP transistors. The reference numeral 214 denotes a capacitor for phase compensation.

In this embodiment, a circuit construction suited for IC can be adopted without the use of the high resistors 5 and 6 shown in FIG. 4. Also, when the input stage of the OP amplifier 2 is an FET, a similar construction can be accomplished by using an FET of the opposite characteristic.

A fourth embodiment of the present invention will now be described. The fourth embodiment is an improvement over the first embodiment. In the first embodiment, to determine the values of $V_H$ and $V_L$, it has been necessary that the maximum crest value of the noise voltage be known.

When extraneous noise is negligible, the maximum crest value of the noise voltage is substantially determined by the heat noise of the magnetic head 1 of FIG. 4 and the noise created from the OP amplifiers 2 and 3.

The heat noise voltage $V_{HTH}$ of the magnetic head 1 is $$V_{HTH}=(4kTBRe[Z])^{\frac{1}{2}}[V_{rms}],$$

where k is Boltzmann's constant $1.38 \times 10^{-23}$ [j/°K.], B is the frequency band used [Hz], T is the absolute temperature of the magnetic head 1 [°K.], and Re[Z] is the real number portion of the impedance of the magnetic head 1 [$\Omega$].

Also, the input-converted noise voltage $V_n$ of the OP amplifiers 2 and 3 is shown as $V_n = 18_n V/(Hz)^{\frac{1}{2}}$, for example, in TL071 produced by TI, Inc.

Consequently, when the frequency band used is B [Hz], the total noise voltage $V_{TN}$ is $$V_{TN} = \{(V_{HTH})^2 + (V_n \sqrt{B})^2\}^{\frac{1}{2}} [V_{rms}]$$

and the crest value thereof is considered to be 4 and therefore, the maximum crest value of the noise voltage is $4V_{TN}$, i.e., $$4V_{TN}=4(4kTRe[Z]+V_n^2)^{\frac{1}{2}} \cdot B[V]$$

and it is apparent that it depends on the frequency used. Also, if the frequency bands used of the OP amplifiers 2 and 3 are high, it is easy to pick up extraneous noise and thus, the frequency bands used of the OP amplifiers 2 and 3 must be limited.

Figure 8:
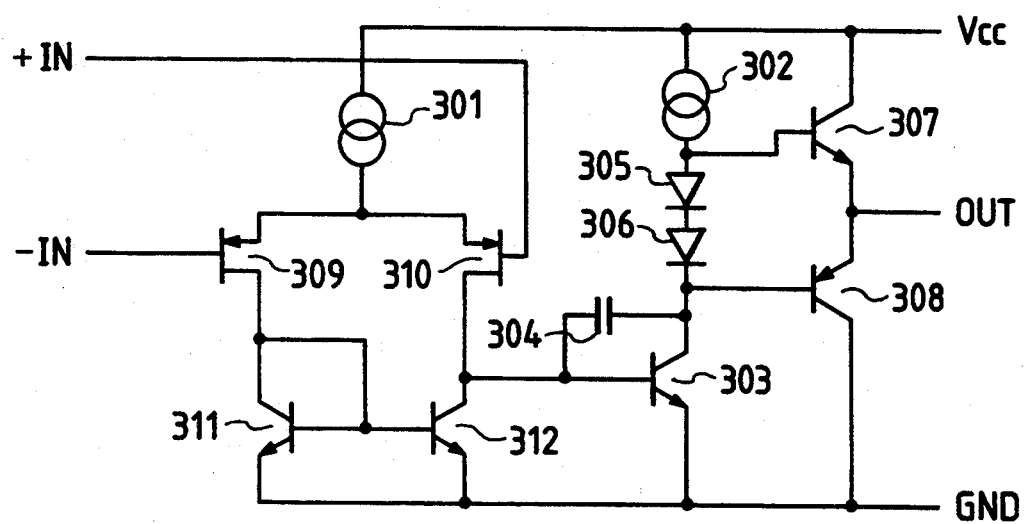
FIG. 8 is a circuit diagram showing an internal equivalent circuit in an amplifying circuit according to a fourth embodiment of the present invention.

FIG. 8 diagrammatically shows the internal equivalent circuit of the OP amplifiers 2 and 3 shown in FIG. 4. In FIG. 8, the reference numerals 309 and 310 designate P channel FETs, the reference numerals 303, 307, 311 and 312 denote NPN transistors, the reference numerals 301 and 302 designate constant current circuits, the reference numeral 304 denotes a capacitor for phase compensation, the reference numerals 305 and 306 designate diodes, and the reference numeral 308 denotes a PNP transistor.

The constant current circuit 301 is a circuit for controlling the operational current of the first-stage circuit of an amplifying circuit comprised of the P channel FETs 309,310 and the NPN transistors 311 and 312. The capacitor 304 is connected to the output portion of said first-stage circuit of the amplifying circuit. Said operation current and the capacity of the capacitor 304 impart an influence to the frequency characteristic of the amplifying circuit. The influence will hereinafter be described.

When the slew rate of the amplifying circuit is SR, $$SR = I_0/C [V/S],$$

where $I_0$ is the current value of the constant current circuit 301, and C is the capacity value of the capacitor 304 for phase compensation. Also, when the voltage of the output of the magnetic head 1 created between the + input terminals of the OP amplifiers 2 and 3 is $V_{IN}$, the voltage $V_{OP2,3out}$ between the output terminals of the OP amplifiers 2 and 3 is $$V_{OP2,3out} = (1 + 2R_{10}/R_9)V_{IN}.$$

Here, when the maximum frequency of the output signal from the magnetic head 1 is $f_{max}$, the current $I_0$ of the constant current circuit 301 or the capacity C of the capacitor 304 for phase compensation is determined so that $SR = f_{max} \cdot V_{OP2,3out}$. With regard also to the OP amplifier 4, the output voltage $V_{OP4out}$ is $$V_{OP4out} = (1 + 2R_{10}/R_9) \cdot (R_{15}/R_{12})V_{2N}.$$

Also, in accordance with this, design is made such that $$SR = 2 \cdot f_{max} V_{OP4out}.$$

Figure 9:
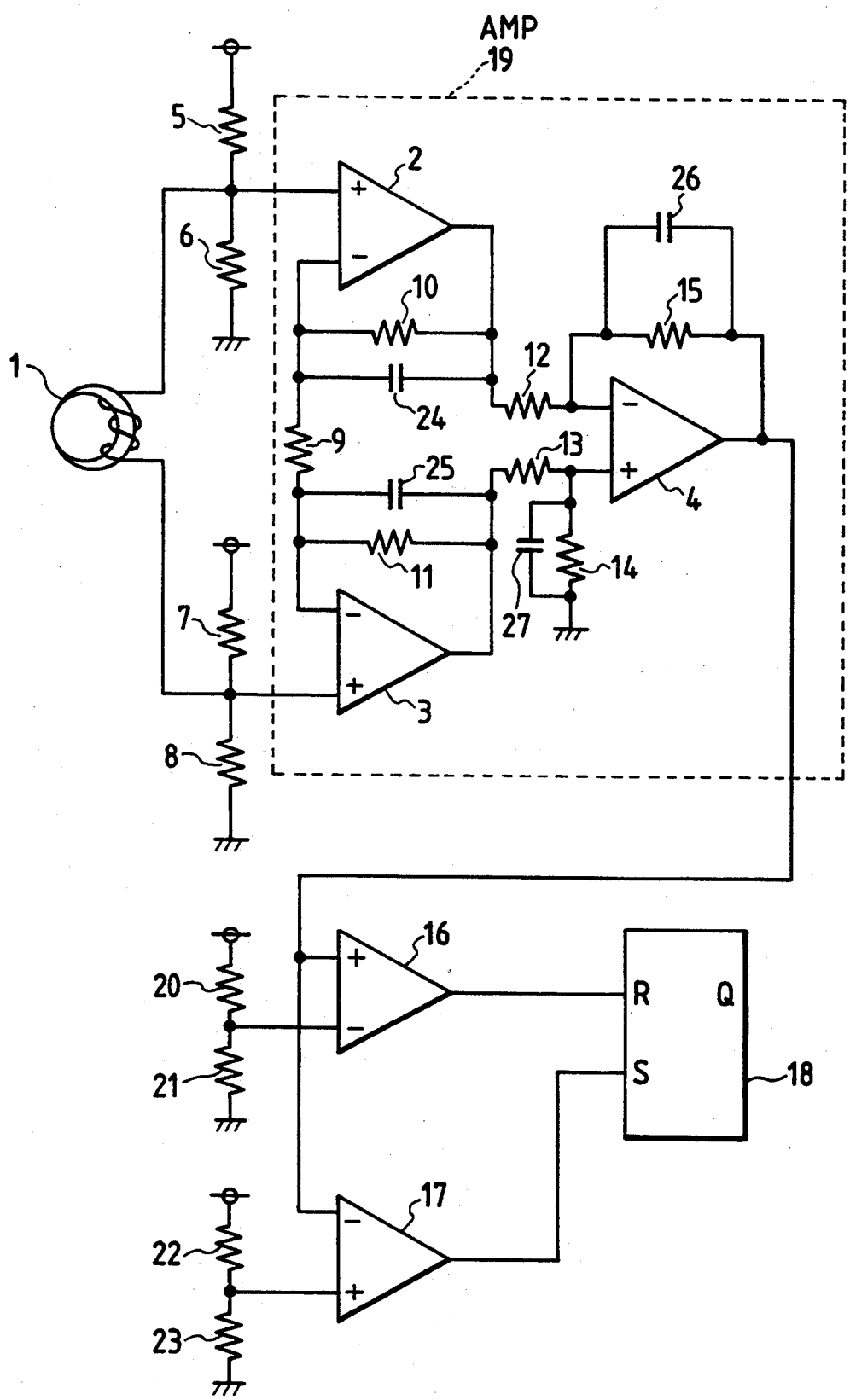
FIG. 9 is a circuit diagram showing a fifth embodiment of the present invention.

FIG. 9 diagrammatically shows a fifth embodiment of the present invention. In FIG. 9, as compared with FIG. 4 which shows the first embodiment, capacitors 24, 25, 26 and 27 are added.

The OP amplifiers 2, 3 and 4 have frequency characteristics sufficiently higher than the frequency of the signal voltage produced by the magnetic head 1. Here, when $$\tfrac{1}{2}\pi f_{max}C_{24} = R_{10}, \quad \tfrac{1}{2}\pi f_{max}C_{26} = R_{15}$$

$$C_{24} = C_{25} \quad C_{26} = C_{27},$$

where $C_{24}$ is the capacity value [F] of the capacitor 24, $C_{25}$ is the capacity value [F] of the capacitor 25, $C_{26}$ is the capacity value [F] of the capacitor 26, and $C_{27}$ is the capacity value [F] of the capacitor 27, the amplification degree of this differential amplifying circuit at the frequency $f_{max}$ is $$(1 + R_{10}/R_9) \cdot R_{15}/2R_{12},$$

and attenuates to ½ of the amplification degree at a substantially low frequency when $R_{10} > R_9$. Consequently, the present embodiment, like the aforedescribed embodiments, can also improve the signal to noise ratio without amplifying the signal at any unnecessary high frequency.

Figure 10:
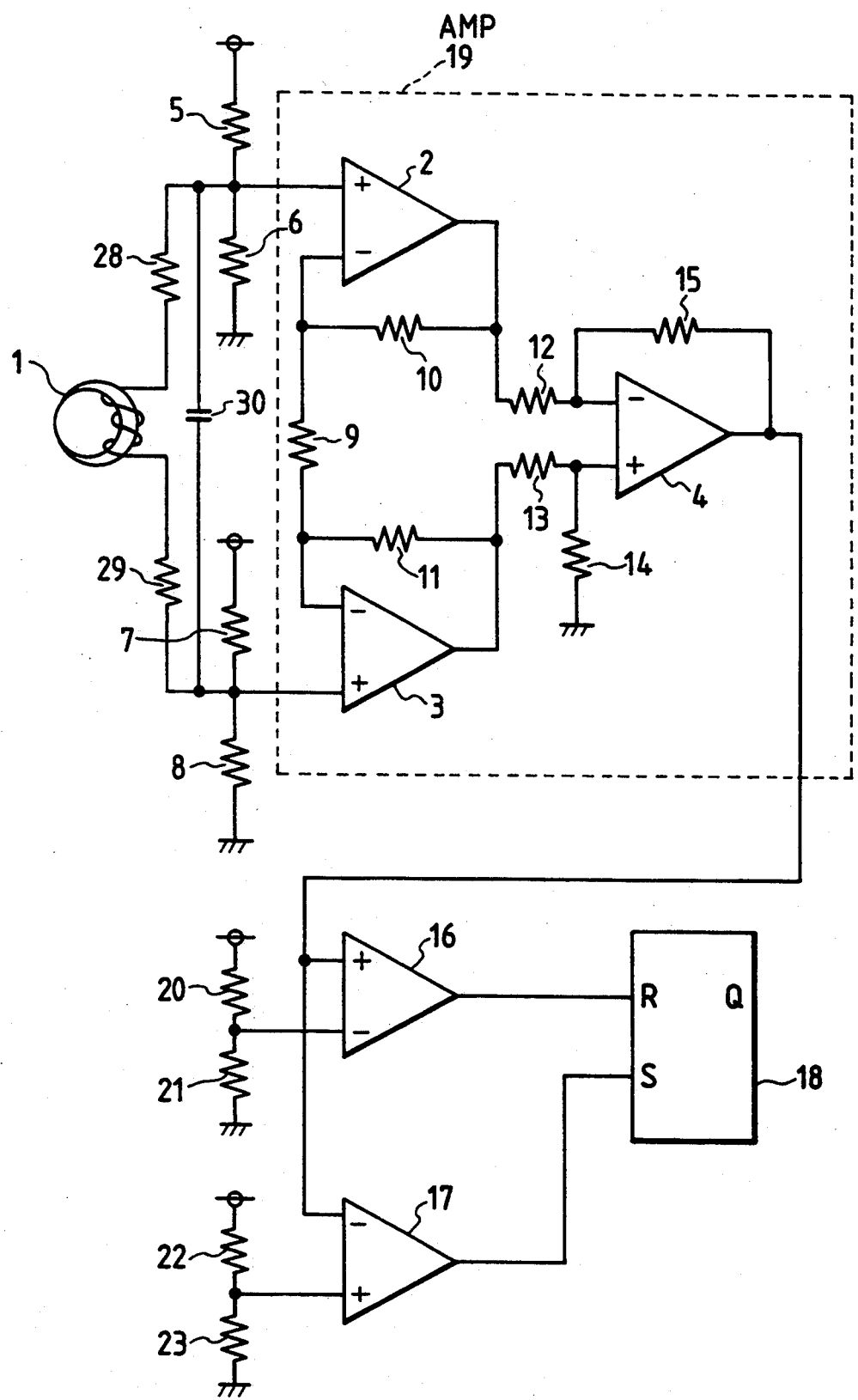
FIG. 10 is a circuit diagram showing a sixth embodiment of the present invention.

A sixth embodiment of the present invention will now be described. FIG. 10 is a circuit diagram showing the amplifying circuit portion of the magnetic amplifying circuit of the sixth embodiment. The present embodiment is such that in FIG. 4 which is a circuit diagram showing the amplifying circuit portion of the first embodiment, resistors 28, 29 and a capacitor 30 are added, and in FIG. 10, the same members as those in FIG. 4 are designated by the same reference numerals.

The output voltage from the magnetic head 1 is minute and disturbance noise is applied before the output voltage reaches the differential amplifying circuit. This noise is great in the same phase component relative to the OP amplifiers 2 and 3. The noise of the same phase component is removed in the differential amplifying circuit 19 by the characteristic of the same phase signal removal ratio (CMRR). However, CMRR is reduced for a high frequency and therefore, CMRR of a high frequency component must be improved.

So, a filter circuit for removing a high frequency signal is added to the input stage. This filter circuit is comprised of resistors 28 and 29 and a capacitor 30.

It is desired that the resistance values $R_{28}$ and $R_{29}$ of the resistors 28 and 29 be 1/10 or less as compared with the real number portion of the impedance of the magnetic head 1 so as not to increase heat noise.

Also, the input impedances of the resistors 5, 6, 7, 8 and the OP amplifiers 2, 3 are sufficiently great as compared with the resistance values $R_{28}$ and $R_{29}$. When the frequency of the signal voltage produced from the magnetic head 1 is $f_{max}$, the capacity $C_{30}$ of the capacitor 25 is determined so that $$C_{30} = 1/\{2\pi f_{max}(R_{28} + R_{29})\}.$$

Also, waveform distortion increases, but the effect of noise removal is great even if $C_{30}$ is rather large.

Figure 11:
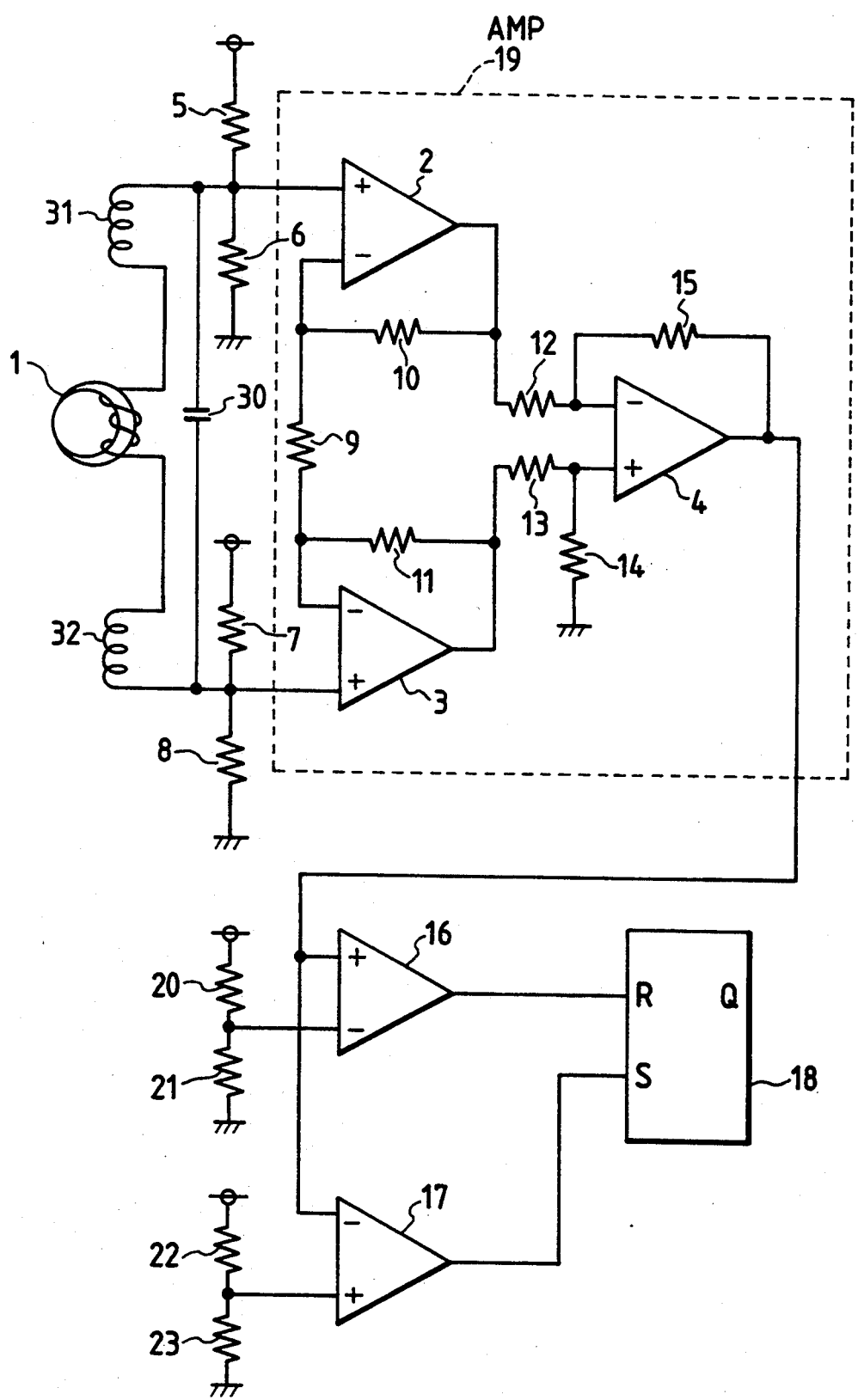
FIG. 11 is a circuit diagram showing a seventh embodiment of the present invention.

FIG. 11 is a circuit diagram showing a seventh embodiment of the present invention. In FIG. 11, the reference numerals 31 and 32 designate coils, and the reference numeral 30 denotes a capacitor. In FIG. 10, a filter is comprised of the resistors 31, 32 and the capacitor 30, whereas in the present embodiment, a filter is comprised of the coils 31, 32 and the capacitor 30.

As regards the inductances L31 and L32 of the coils 31 and 32, it is desired that in the frequency used, the impedances thereof be small as compared with the impedance of the magnetic head 1.

Also, the capacity value $C_{30}$ of the capacitor 30 is determined as $$C_{30} = 1/(2\pi f_{max})^2(L_{31} + L_{32}).$$

Figure 12:
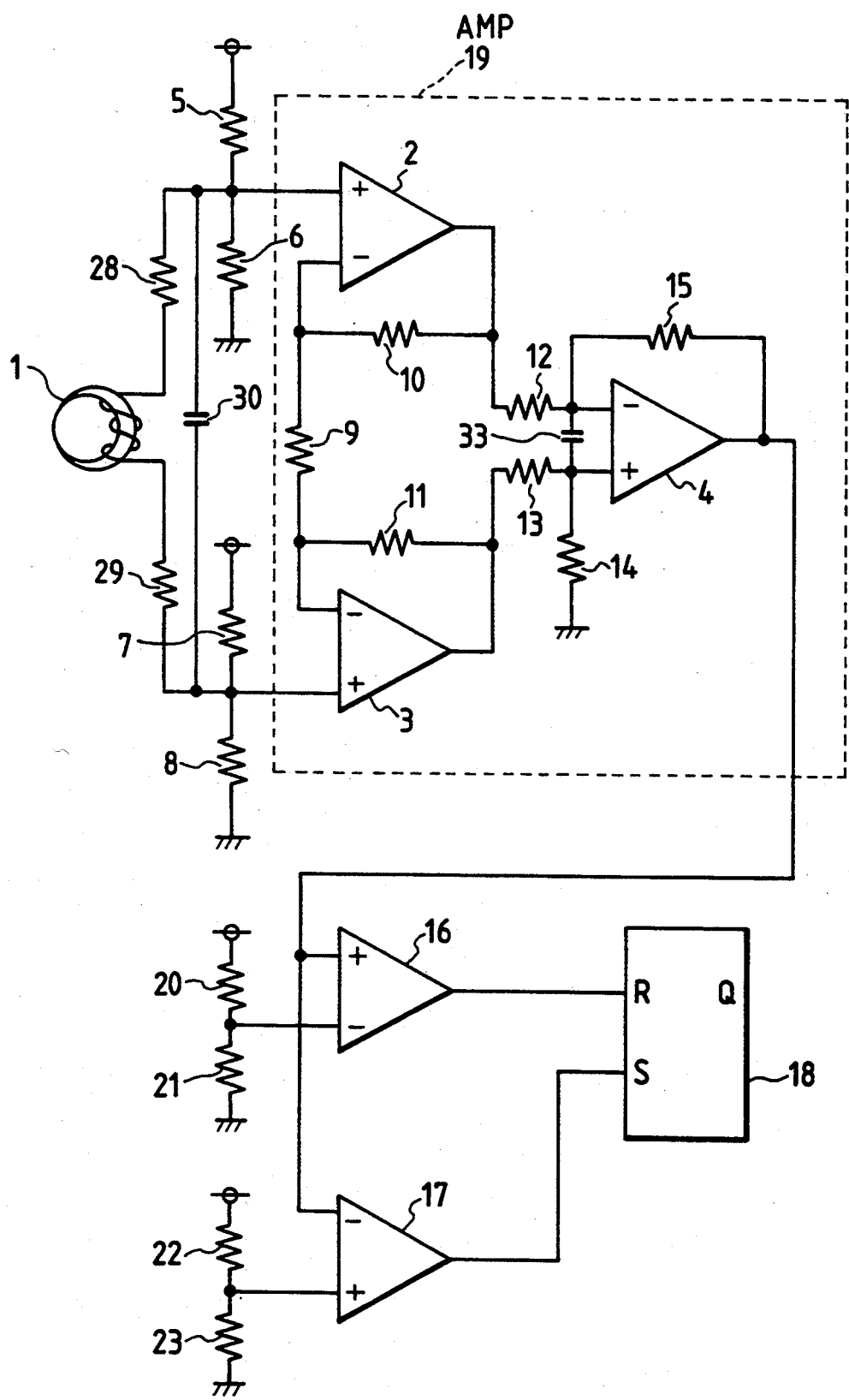
FIG. 12 is a circuit diagram showing an eighth embodiment of the present invention.

FIG. 12 diagrammatically shows an eighth embodiment of the present invention. In FIG. 12, a capacitor 33 is added to the input of the OP amplifier 4, and the high frequency signal removal ratio at a high frequency is further improved. The capacity $C_{33}$ of the capacitor 33 is $$C_{33} = \frac{1}{2}\pi f_{max}(R_{12}+R_{13}).$$

However, $C_{33}$ can be made greater when the waveform distortion may be great.

Figure 13:
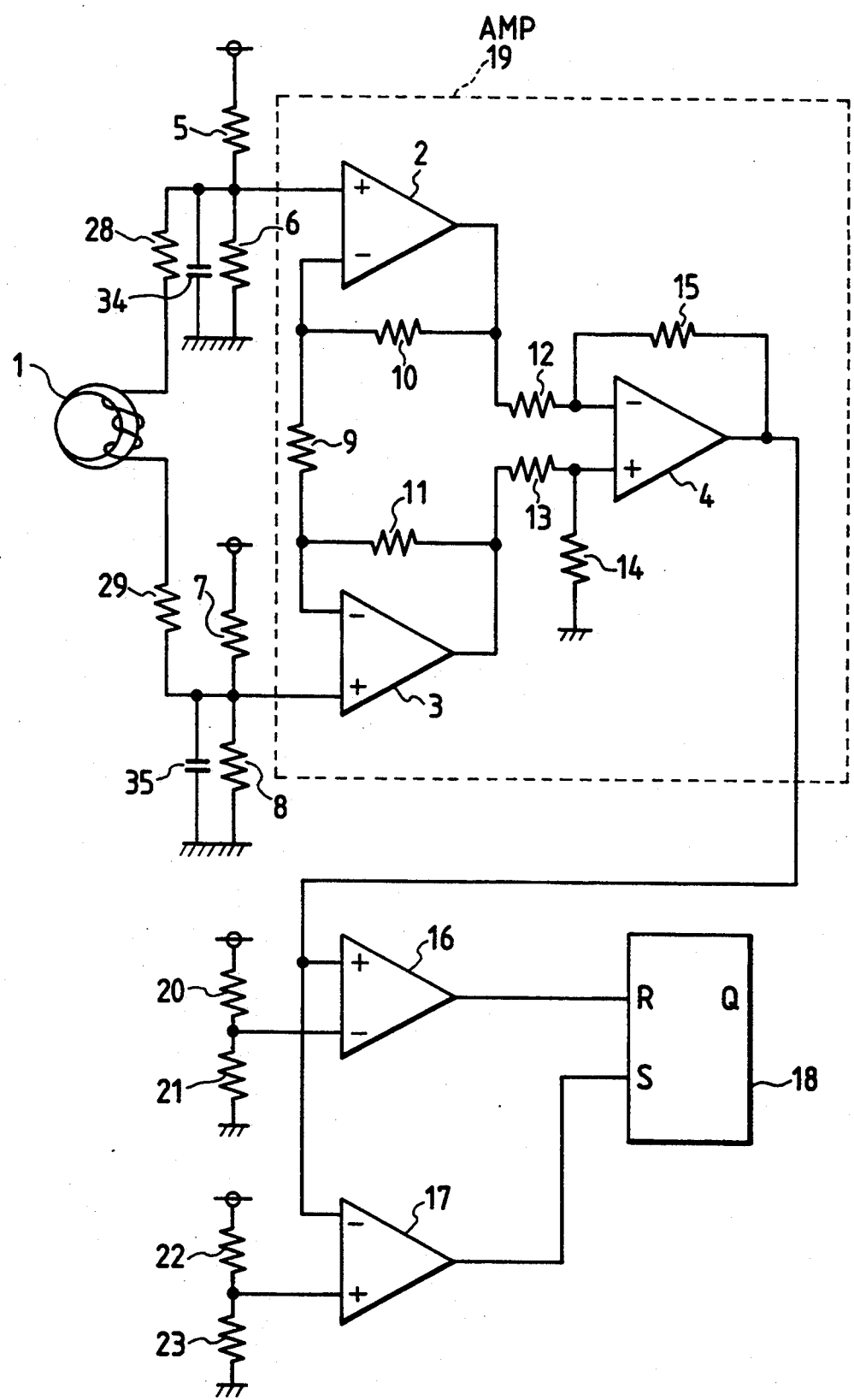
FIG. 13 is a circuit diagram showing a ninth embodiment of the present invention.

FIG. 13 diagrammatically shows a ninth embodiment of the present invention. As compared with the embodiment of FIG. 10, capacitors 34 and 35 are added to the input terminals of the OP amplifiers 2 and 3. Thus, filter circuits are comprised of the resistor 28 and the capacitor 34, and the resistor 29 and the capacitor 35, respectively, and the high frequency components of noise voltages input to the OP amplifiers 2 and 3 are removed. Here, it is to be understood that $$C_{34} = \frac{1}{2}\pi f_{max}R_{28}.$$

$$C_{35} = \frac{1}{2}\pi f_{max}R_{29}.$$

If $C_{34}$ and $C_{35}$ are great as far as the waveform distortion permits, the effect of noise removal will be great.

Figure 14:
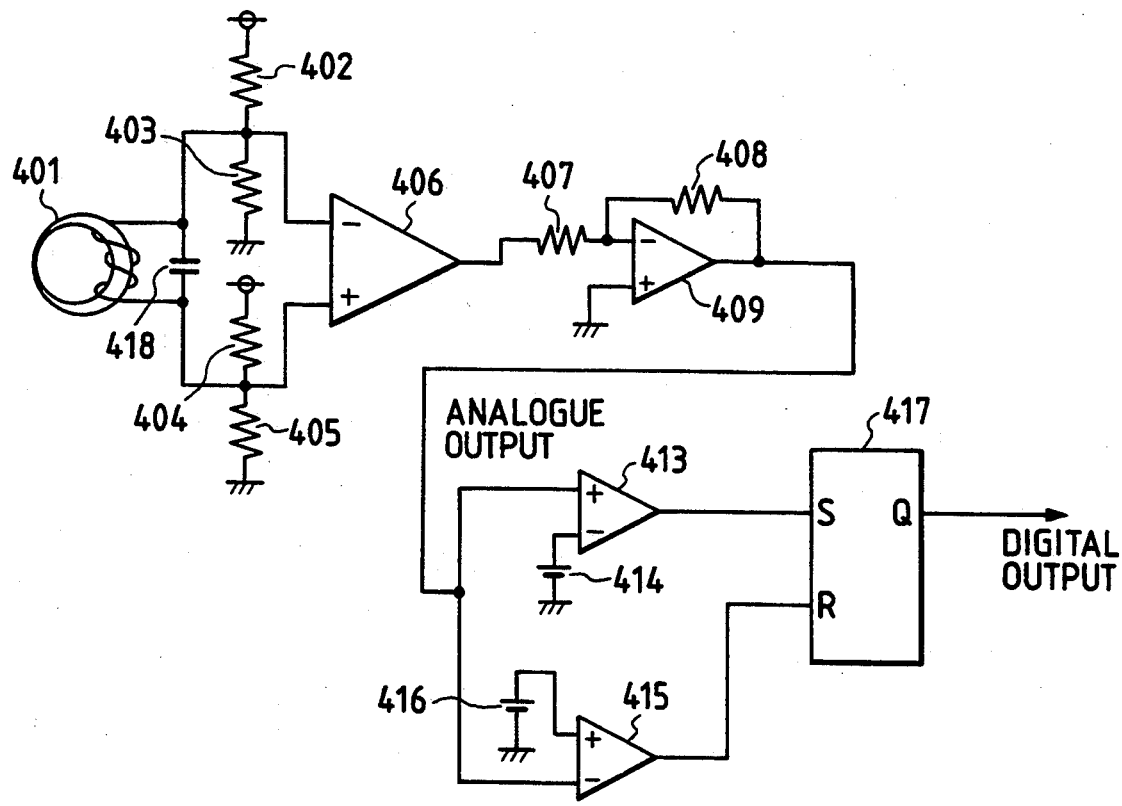
FIG. 14 diagrammatically shows a circuit of the type of the sixth embodiment of the present invention.

Description will now be made of a circuit as shown in the sixth embodiment wherein a capacitor is parallel-connected to the magnetic head 1, or a circuit equivalent to a case when a capacity is created during the output from the magnetic head and a capacitor is substantially parallel-connected to the magnetic head. FIG. 14 diagrammatically shows the circuit as described above.

The reference numeral 401 designates a magnetic head, the reference numerals 402, 403, 404 and 405 denote bias resistors, the reference numeral 406 designates a differential amplifier (for example, AD524 produced by Analog Devices, Inc.), the reference numerals 407 and 408 denote resistors, the reference numeral 409 designates an operational amplifier (an OP amplifier such as TL071 produced by Texas Instruments (TI), Inc.), the reference numerals 413 and 415 denote comparators (for example, LM2903 produced by TI, Inc.), the reference numerals 414 and 416 designate reference voltage sources, the reference numeral 417 denotes an RS flip-flop (for example, SN74279 produced by TI, Inc.), and the reference numeral 418 designates a capacitor (the capacity of which is $C_0[F]$). Here, the voltage produced across the magnetic head 401 is amplified by the differential amplifier, and thereafter is further amplified by the OP amplifier 409 at an amplification degree by the ratio between the resistors 407 and 408. The output of this OP amplifier 409 is defined as an analog output.

Figure 15:
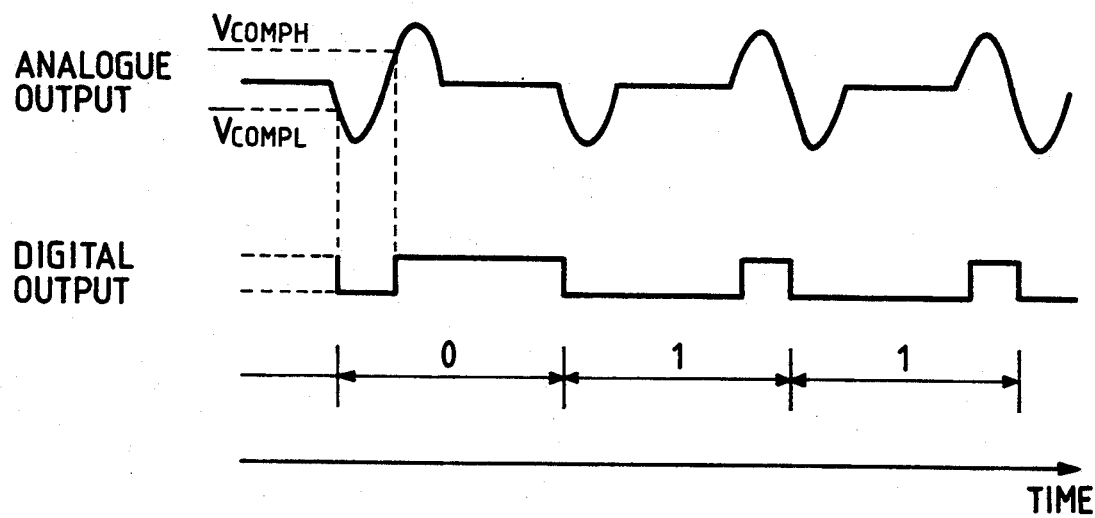
FIG. 15 shows the output waveform of each portion of the circuit of FIG. 14.
Figure 16:
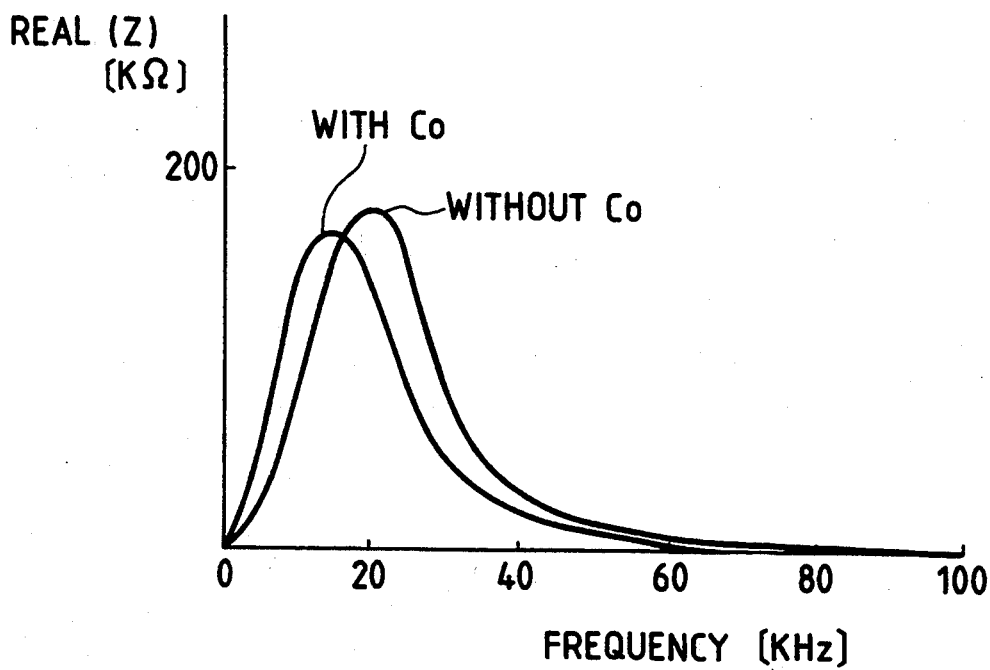
FIG. 16 is a graph showing the impedance of a magnetic head in the circuit of FIG. 14.

The analog output is then input to the comparators 413 and 415. In the comparator 413, the − input terminal thereof is connected to a reference voltage 414 of a voltage value $V_{COMPH}$. Also, the + input terminal of the comparator 415 is connected to a reference voltage 416 of a voltage value $V_{COMPL}$. Consequently, when the analog output exceeds $V_{COMPH}$, the output of the comparator 413 becomes 1 (H level), and when the analog output becomes lower than $V_{COMPL}$, the output of the comparator 415 becomes zero (L level). The digital output as the output of the RS flip-flop 417 exhibits a waveform as shown in FIG. 15 in conformity with the analog output. In FIG. 15, the horizontal axis represents time, and the digital output is modulated, with the time from the falling until the rising thereof considered to be 1 clock of a signal, by a pulse position modulation system which determines 0 and 1 of the signal by the time from the falling until the rising. If the time from the falling until the rising is shorter than the time of $\frac{1}{2}$ clock, the signal becomes 0, and if the time from the falling until the rising is longer than the time of $\frac{1}{2}$ clock, the signal becomes 1. By the capacitor 418 being parallel-connected to the magnetic head 401, the peak of the real number portion of the impedance of the magnetic head 401 can be lowered as shown in FIG. 16. The abscissa of FIG. 16 represents frequency, and the ordinate of FIG. 16 represents the real number portion of the impedance. The magnetic head exhibits a resonating state in the real number portion of the impedance by the coils and buoyant capacity, as shown.

Figure 17:
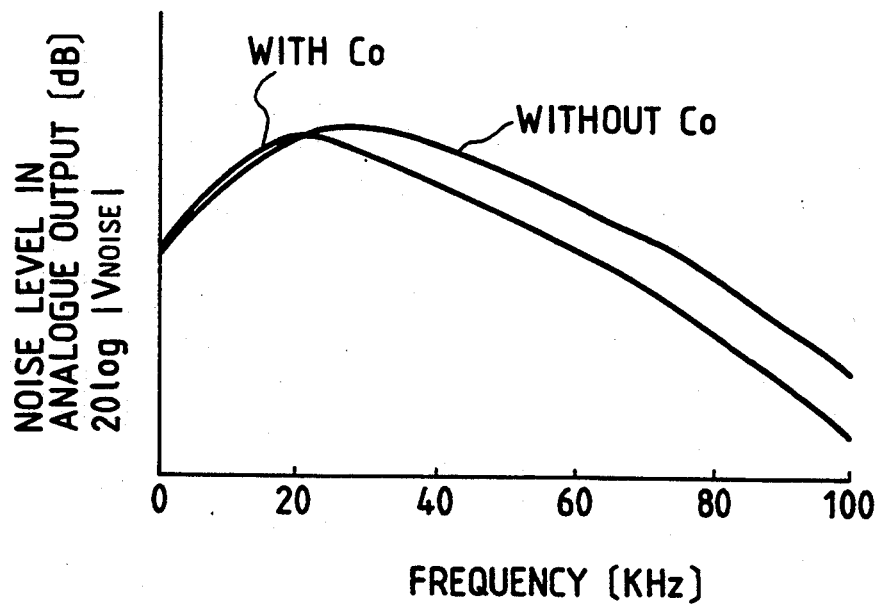
FIG. 17 is a graph showing the noise voltage characteristic of the circuit of FIG. 14.

Consequently, in FIG. 17, the noise voltage increased by the addition of the capacitor 418 in conformity with the real number portion of the impedance is reduced at 0–100 KHz. Therefore, the noise voltage at 0–100 KHz is reduced by the addition of the capacitor 418. The frequency band required for the reproduction of a signal is of the order of 100 Hz to 40 KHz and therefore, considering a reproducing system using a filter of a small order, noise can be reduced by the addition of the capacitor 418. In FIG. 17, the abscissa represents frequency and the ordinate logarithmically represents the voltage of the analog output when there is no input signal in the magnetic head 401.

The essential portions of the construction of a tenth embodiment of the present invention will now be described with reference to FIG. 18. The reference numeral 401 designates a magnetic head, and the reference numerals. 402, 403, 404 and 405 denote the bias resistors of a differential amplifying circuit. These bias resistors 402, 403, 404 and 405 are of a value ten or more times as great as the impedance of the magnetic head 401. Also, the bias current of the differential amplifying circuit 406 is of a degree which can be supplied by the bias resistors 402, 403, 404 and 405. An OP amplifier 409 amplifies the output of the differential amplifying circuit 406 at an amplification degree determined by resistors 407 and 408. A filter circuit block 410 is comprised of filter circuits 411 and 412, which are SR-4BL3 produced by NF Circuit Block, Inc. Each of these filter circuits can constitute four orders of low-pass filters. Consequently, in the filter circuit block 410, two stages of four orders of filters constitute eight orders of low-pass filters. There are several methods of constructing the filters, but here, the Batterworse type or the Bessel type is desired from the waveform transmitting characteristic. The output of the filter circuit block 410 is defined as the filter output. A reference voltage $V_{COMPH}$ 414 for comparison is connected to the − input terminal of a comparator 413. Consequently, when the filter output exceeds $V_{COMPH}$, the output of the comparator 413 becomes 1 (HI) output. Also, a reference voltage $V_{COMPL}$ 416 for comparison is connected to the + input terminal of a comparator 415. Consequently, when the filter output is smaller than $V_{COMPL}$, the output of the comparator 415 becomes 1 (HI) output. An RS flip-flop circuit 417 is such that when 1 and zero are input to the S input terminal and R input terminal, respectively, thereof, 1 is output to the output terminal Q thereof. When zero and 1 are input to the S input terminal and R input terminal, respectively, zero is output to the output terminal Q. The output Q of the RS flip-flop circuit 417 is defined as a digital output.

Figure 19:
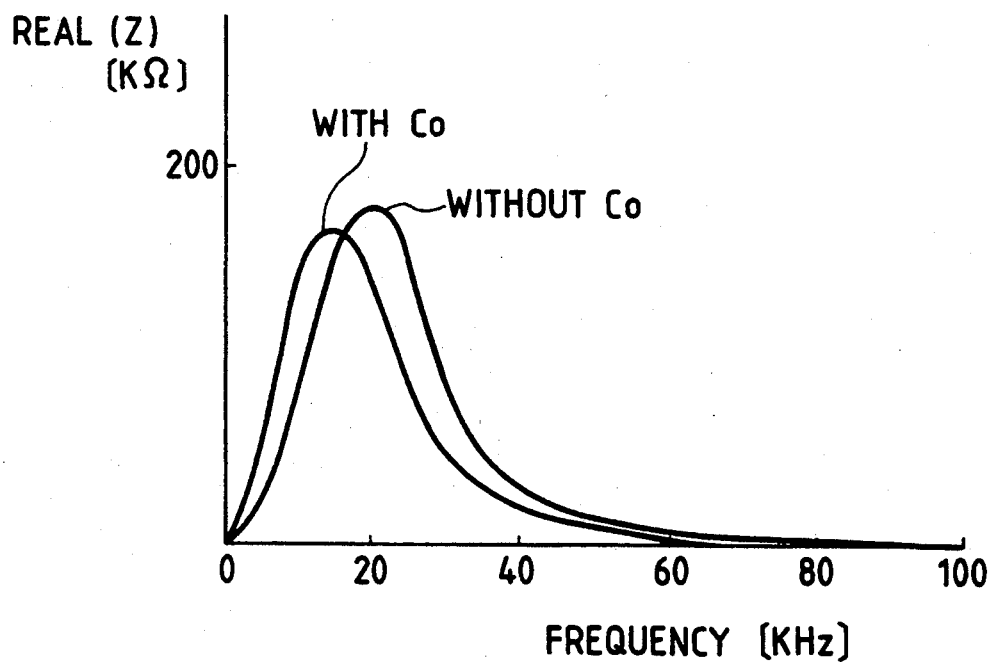
FIG. 19 is a graph showing the value of the real number portion of the impedance of a magnetic head in the circuit of FIG. 18.

FIG. 19 is a graph showing the real number portion characteristic of the frequency vs. impedance of the magnetic head 401. The peak value of the real number portion of the impedance is great as compared with the case when in the prior art, a capacitor 418 of $C_0[F]$ was added, and the frequency also moves to a higher side. When there is no input signal in the magnetic head 401, the noise voltage produced from the magnetic head 401 as it is observed at the analog output becomes such as shown in FIG. 21.

Figure 20:
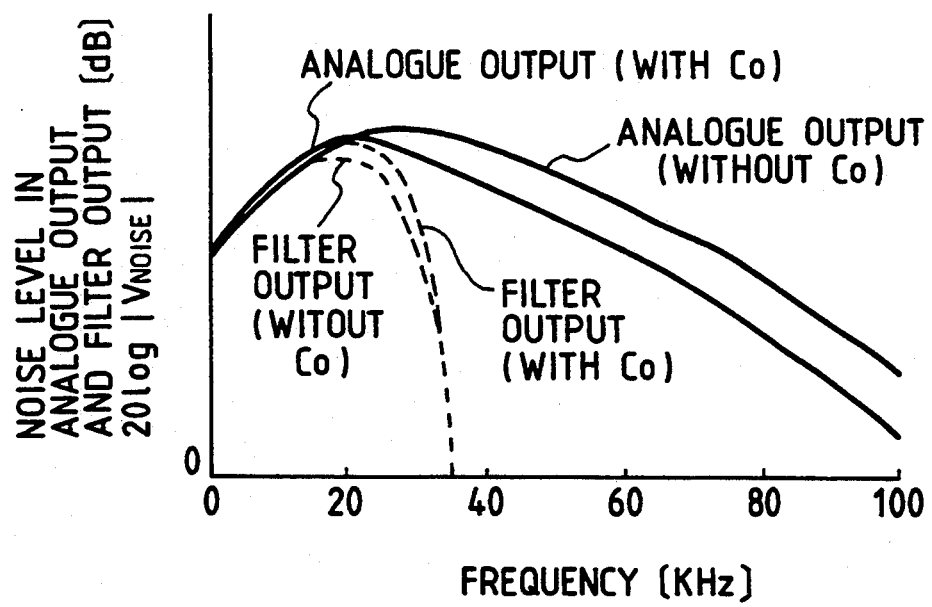
FIG. 20 is a graph showing the noise voltage characteristic of the circuit of FIG. 18.

FIG. 20 is a graph showing the frequency vs. noise voltage. The noise voltage $V_{noise}$ of FIG. 20 is substantially proportional to $\{4kTBReal(Z)\}^{\frac{1}{2}}$, where k: Boltzmann's constant $1.38 \times 10^{-23}[J/°K.]$
T: absolute temperature [°K.]
B: frequency band [Hz], here at each 1 Hz.
Real (Z): real number portion of the impedance.

Consequently, as regards the peak of the noise voltage, the analog output (without $C_0$) is great as compared with the analog output (with $C_0$), and the frequency also moves to a higher side. However, the noise voltage at the filter output as it is observed is such as indicated by a dotted line in FIG. 20. Here is shown a case where the cut-off frequency of the low-pass filter in the filter circuit block 410 is in the vicinity of 15 KHz. At this time, the filter output (without $C_0$) is reduced over the whole frequency band as compared with the filter output (with $C_0$). However, it is apparent from FIG. 20 that as compared with the analog output, the noise voltage of the filter output is reduced on the order of $\frac{1}{2}-\frac{1}{3}$.

Figure 18:
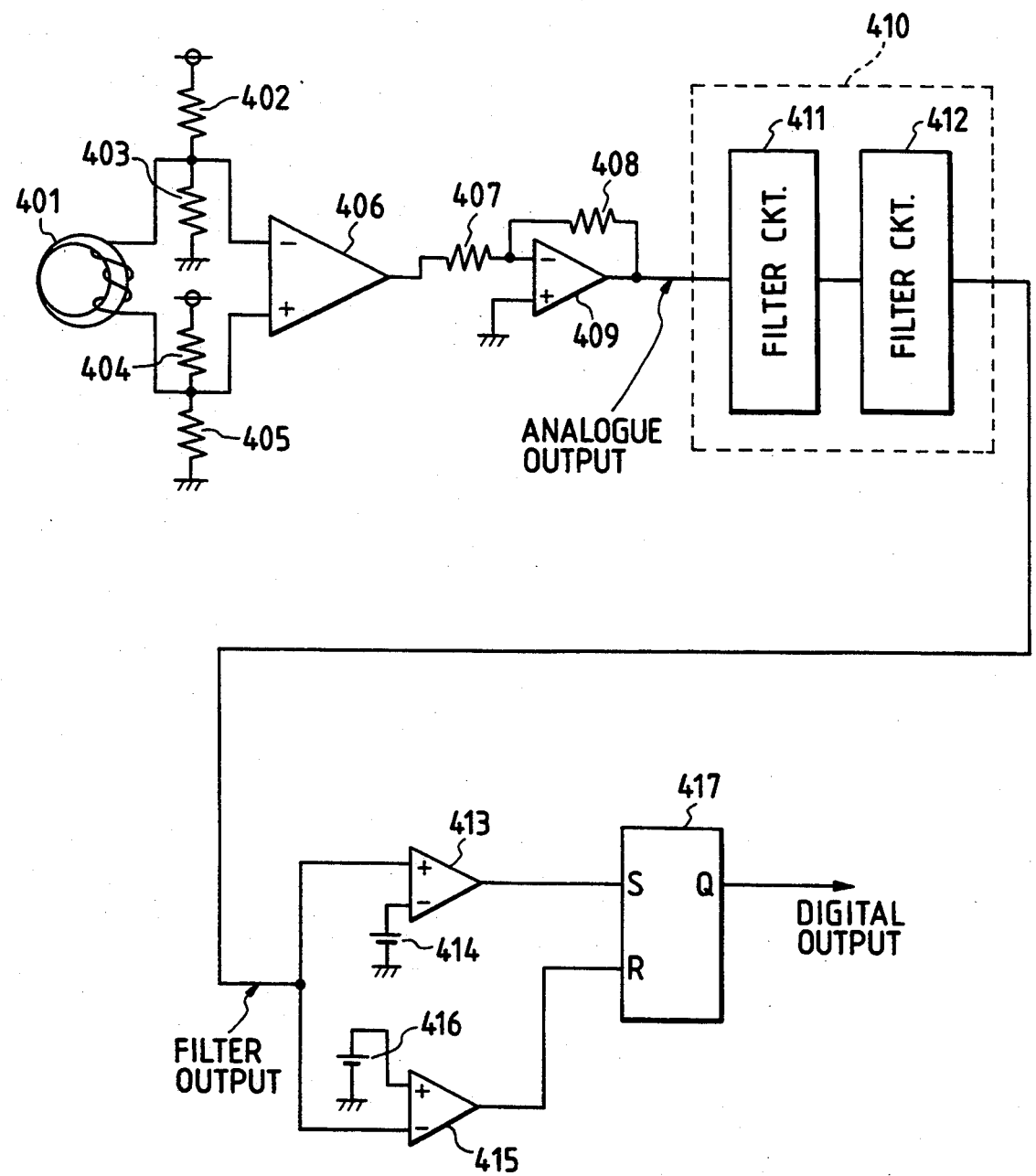
FIG. 18 diagrammatically shows a magnetic recording-reproducing circuit according to a tenth embodiment of the present invention.
Figure 21:
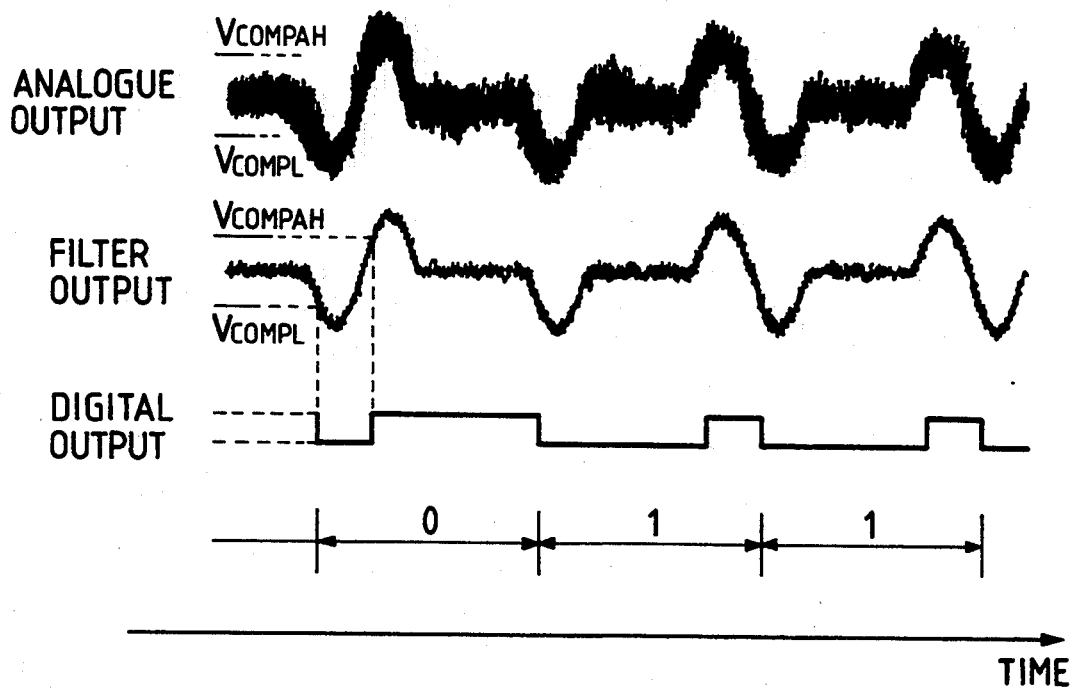
FIG. 21 shows the output waveform of each portion of the circuit of FIG. 18.

FIG. 21 shows the variations by time in the analog output, the filter output and the digital output of the amplifying circuit shown in FIG. 18. With the analog output shown in FIG. 21, it has sometimes been the case that the noise voltage superposed upon the output of the magnetic head 401 exceeds the reference voltages $V_{COMPH}$ and $V_{COMPL}$ of the comparators 413 and 415 and a wrong signal is reproduced. In contrast, in the filter output, as shown in FIG. 21, the noise voltage is reduced to $\frac{1}{2}-\frac{1}{3}$ and therefore, the signal of the digital output can be obtained without any error. Also, since the capacitor 418 (FIG. 14) added to the magnetic head 401 is eliminated, the noise voltage can be further decreased.

Figure 22:
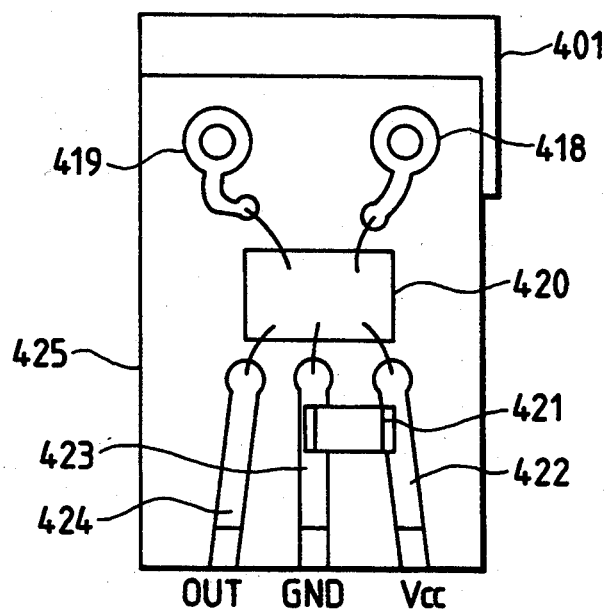
FIG. 22 is a plan view showing a chip and a base plate in an eleventh embodiment of the present invention.

FIG. 22 shows an eleventh embodiment of the present invention. The reference numeral 401 designates a magnetic head, the reference numerals 418 and 419 denote input patterns on the base plate 425 of a differential amplifier 420, the reference numeral 420 designates a differential amplifier IC chip, the reference numeral 422 denotes a power source pattern on the base plate 425, the reference numeral 423 designates a GND pattern on the base plate 25, the reference numeral 421 denotes a bypass capacitor, and the reference numeral 424 designates an output pattern on the base plate 425. As is apparent from FIG. 22, the distance between the magnetic head 401 and the IC chip of the differential amplifier 420 was shortened, that is, the IC chip was mounted on a chip-on-board and the electrostatic capacity present thereon was decreased from the mounting. Consequently, the electrostatic capacity was further decreased and therefore, even if a filter of the same high order was used, the noise voltage could be decreased.

Figure 23:
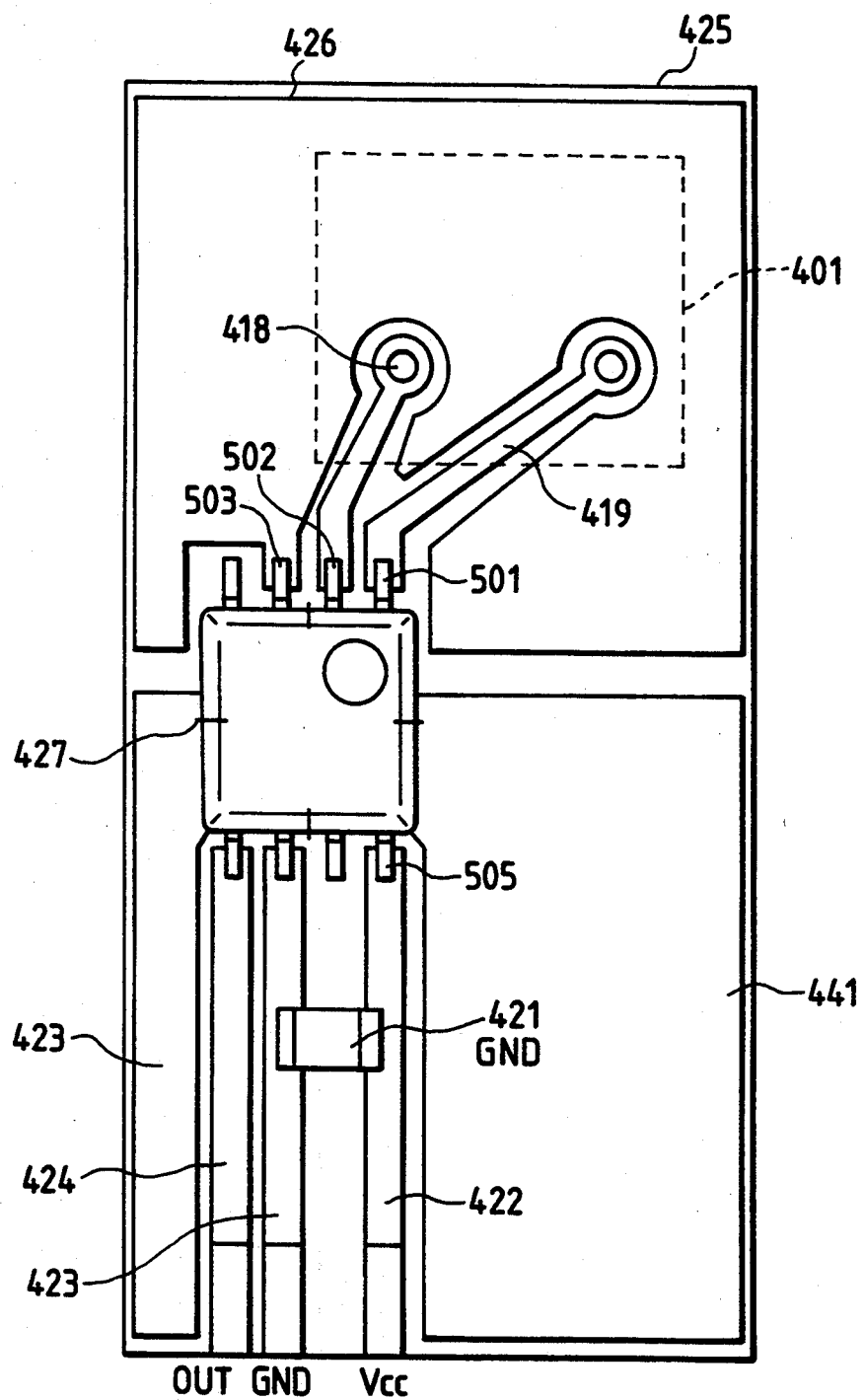
FIG. 23 is a plan view showing a chip and a base plate in a twelfth embodiment of the present invention.
Figure 24:
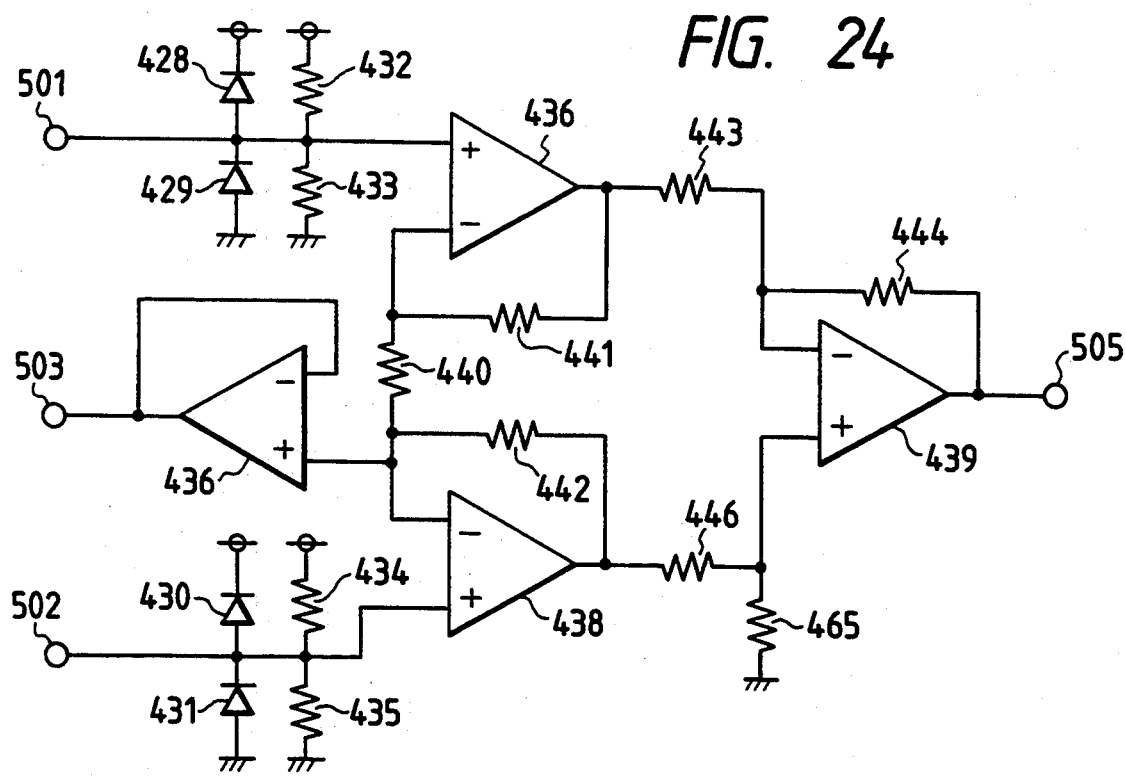
FIG. 24 diagrammatically shows a circuit in the chip of FIG. 23.
Figure 25:
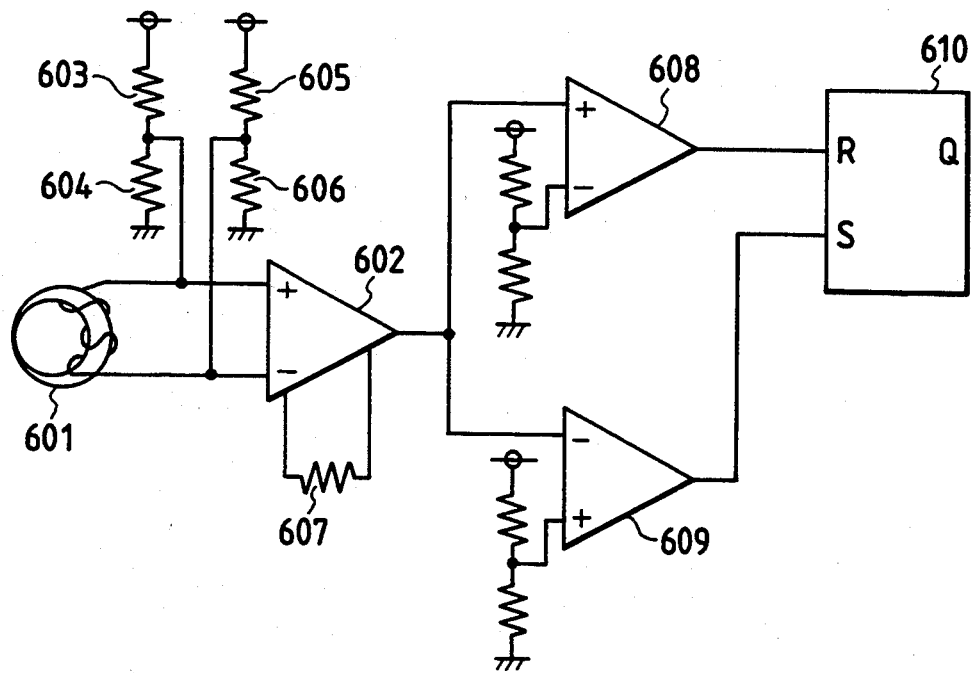
FIG. 25 diagrammatically shows a magnetic recording-reproducing circuit according to the prior art.
Figure 26:
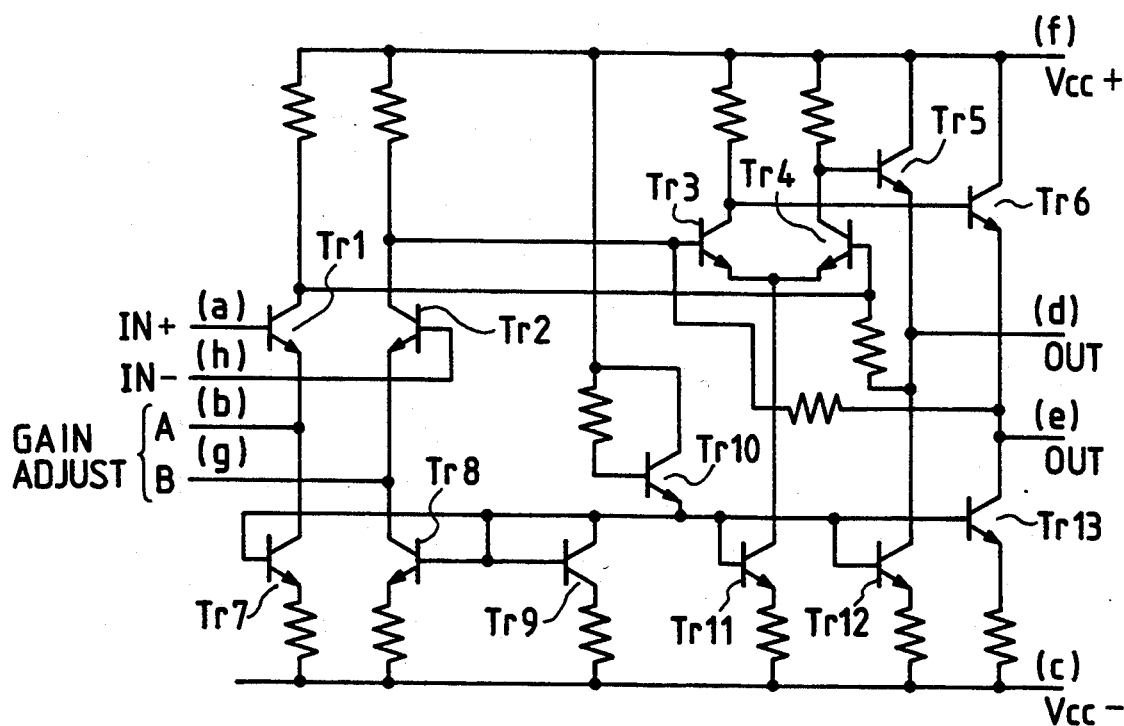
FIG. 26 diagrammatically shows an internal equivalent circuit in the amplifying circuit of FIG. 25.
Figure 27:
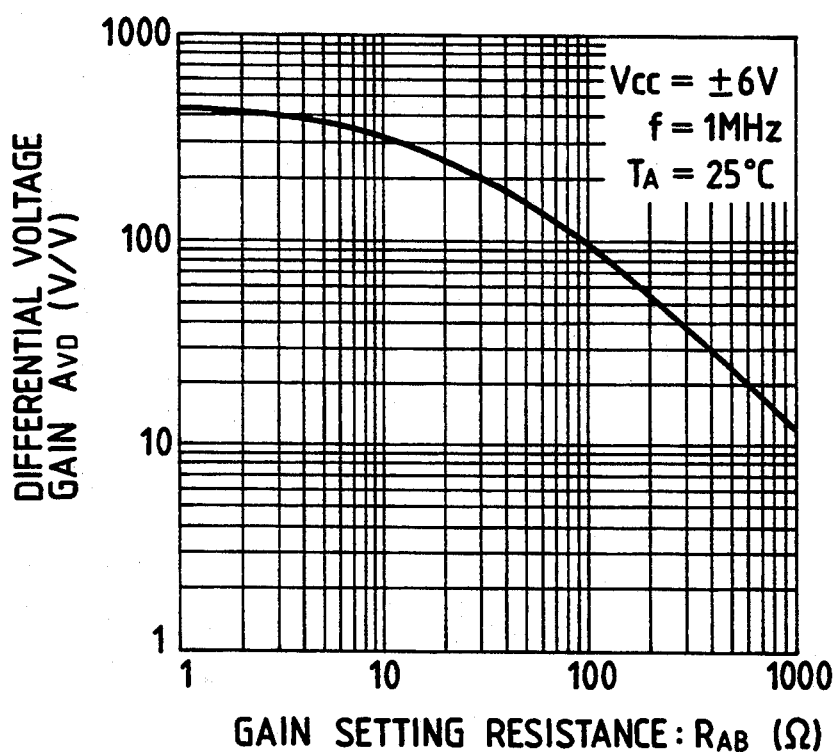
FIG. 27 shows the characteristic of the waveform of the circuit of FIG. 25.

FIGS. 23 and 24 show a twelfth embodiment of the present invention. FIG. 24 shows a circuit in the differential amplifier of FIG. 23. In FIGS. 23 and 24, the reference numeral 401 designates a magnetic head, the reference numerals 418 and 419 denote input patterns on the base plate 425 of a differential amplifier 427, the reference numeral 421 designates a bypass capacitor, the reference numeral 422 denotes a power source pattern on the base plate 425, the reference numeral 423 designates a GND pattern on the base plate 425, the reference numeral 426 denotes a feedback pattern on the base plate 425, the reference numeral 427 designates a differential amplifier, the reference numerals 428, 429,430 and 431 denote input protecting diodes, the reference numerals 432, 433, 434 and 435 designate bias resistors, the reference numerals 436,437,438 and 439 denote OP amplifiers, and the reference numerals 440, 441, 442, 443, 444, 445 and 446 designate resistors for determining the amplification degree. The input terminal and the output terminal are given the pin numbers of the differential amplifier 427. The differential voltage applied to differential input terminals 501 and 502 is amplified at an amplification degree of $$\{1+(R_{441}+R_{442})/R_{440}\}\cdot(R_{444}/R_{443}),$$

where $R_{443}=R_{445}$ and $R_{444}=R_{446}$.

Also, the OP amplifier 436 outputs the same voltage as the − input terminal voltage of the OP amplifier 438, i.e., the + input terminal voltage of the OP amplifier 439. Consequently, the output of the OP amplifier 436 is connected from the third terminal of the differential amplifier 427 to the feedback pattern 426 and therefore, the voltage of the input pattern 419 and the voltage of the feedback pattern 426 become equal to each other, and the electrostatic capacity is cancelled.

As described above, the cameras of the tenth to twelfth embodiments and the magnetic information recording-reproducing circuits carried therein are provided with a filter of a high order after the first stage amplifier output and the electrostatic capacity around the magnetic head is decreased, whereby the noise voltage superposed upon the first stage amplifier output can be decreased, and even when in a camera of low film feeding speed, the output signal from the magnetic head is small, the signal can be reproduced without any error.

What is claimed is:

1. A magnetic recording-reproducing circuit in a camera for reproducing information recorded on magnetic recording portion of a film during film feeding, said circuit in a camera comprising:

a magnetic head for reproducing information recorded on the magnetic recording portion;

a first amplifying circuit having at least two input ends, an output of said magnetic head being connected to one of said input ends of said first amplifying circuit;

a second amplifying circuit having at least two input ends, an output of said magnetic head being connected to one of said input ends of said second amplifying circuit;

a first impedance for connecting the other input end of said first amplifying circuit and the other input end of said second amplifying circuit together;

a second impedance for connecting said other input end and the output end of said first amplifying circuit together;

a third impedance for connecting said other input end and the output end of said second amplifying circuit together;

a third amplifying circuit to which outputs of said first and second amplifying circuits are input;

a first comparison circuit for comparing an output of said third amplifying circuit with a first reference value and for producing an output;

a second comparison circuit for comparing the output of said third amplifying circuit with a second reference value and for producing an output; and a binarization circuit for binarizing information recorded on the film on the basis of the outputs of said first and second comparison circuits.

2. A magnetic recording-reproducing circuit in a camera according to claim 1, further comprising:

a bias current control circuit connected between the output of said magnetic head and said one input end of said first amplifying circuit or between the output of said magnetic head and said one input end of said second amplifying circuit, for controlling the bias current of a transistor at the input stage of one of said first and second amplifying circuits.

3. A magnetic recording-reproducing circuit in a camera according to claim 2, wherein said bias current control circuit comprises a transistor opposite in polarity to said transistor at said input stage, and a constant current circuit.

4. A magnetic recording-reproducing circuit in a camera according to claim 1, further comprising:

control means for controlling a frequency characteristic of an amplification degree of at least one of said first and second amplifying circuits to a band in which an input signal is created.

5. A magnetic recording-reproducing circuit in a camera according to claim 4, wherein said control means comprises a constant current circuit for controlling the operational current of the first stage circuit portion of at least one of said first and second amplifying circuits, and for changing the constant current flowing to said constant current circuit to thereby control said frequency characteristic.

6. A magnetic recording-reproducing circuit in a camera according to claim 4, wherein said control means comprises a capacitor connected to an output of a first stage circuit portion of at least one of said first and second amplifying circuits, and changes a capacity of said capacitor to thereby control said frequency characteristic.

7. A magnetic recording-reproducing circuit in a camera according to claim 4, wherein said control means is connected between said other input end and the output end of said first amplifying circuit or between said other input end and the output end of said second amplifying circuit.

8. A magnetic recording-reproducing circuit in a camera according to claim 7, wherein said control means comprises capacitor.

9. A magnetic recording-reproducing circuit in a camera according to claim 1, further comprising:

a fourth impedance for connecting an output of said first amplifying circuit and one of the inputs of said third amplifying circuit together;

a fifth impedance for connecting an output of said second amplifying circuit and the other input of said third amplifying circuit together;

a sixth impedance for connecting one of the inputs and the output of said third amplifying circuit together; and a seventh impedance for connecting the other input of said third amplifying circuit and ground together.

10. A magnetic recording-reproducing circuit in a camera according to claim 9, further comprising:

control means for controlling a frequency characteristic of an amplification degree of said third amplifying circuit to a frequency band in which an input signal is created.

11. A magnetic recording-reproducing circuit in a camera according to claim 10, wherein said control means comprises a capacitor connected in parallel to said sixth impedance and between one of the inputs and the output of said third amplifying circuit.

12. A magnetic recording-reproducing circuit in a camera according to claim 10, wherein said control means comprises a capacitor connected in parallel to said seventh impedance and between the other input of said third amplifying circuit and ground.

13. A magnetic recording-reproducing circuit in a camera according to claim 9, further comprising:

an eighth impedance connected between an output of said magnetic head and one of the inputs of said first amplifying circuit or between an output of said magnetic head and one of the inputs of said second amplifying circuit; and a capacitor for connecting said one input end of said first amplifying circuit and said one input end of said second amplifying circuit together.

14. A magnetic recording-reproducing circuit in a camera according to claim 13, wherein said eighth impedance is a coil.

15. A magnetic recording-reproducing circuit in a camera according to claim 9, further comprising:

a capacitor for connecting one input and the other input of said third amplifying circuit together.

16. A magnetic recording-reproducing circuit in a camera according to claim 13, further comprising:

a ninth impedance connected between an output of said magnetic head and one of the inputs of said first amplifying circuit or between an output of said magnetic head and one of the inputs of said second amplifying circuit; and a capacitor for connecting an input of an amplifying circuit to which said ninth impedance is connected and ground together.

17. A magnetic recording-reproducing circuit in a camera for reproducing information recorded on a magnetic recording portion of a film during feeding, said circuit comprising:

a magnetic head for reproducing information recorded on the magnetic recording portion;

an amplifying circuit to which an output of said magnetic head is input;

a low-pass filter connected to an output of said amplifying circuit;

a first comparison circuit for comparing an output of said low-pass filter with a first reference value and for producing an output;

a second comparison circuit for comparing the output of said low-pass filter with a second reference value and for producing an output; and a binarization circuit for binarizing information recorded on the film on the basis of the outputs of said first and second comparison circuits.

18. A magnetic recording circuit according to claim 17, wherein a cut-off frequency of said low-pass filter is lower than a resonance frequency during mounting of said magnetic head.

19. A magnetic recording-reproducing circuit according to claim 1, further comprising:

an electrode surrounding said magnetic head, a voltage of said electrode being the same voltage as a terminal voltage of said magnetic head.

20. A magnetic recording-reproducing circuit according to claim 19, further comprising:
a fourth amplifying circuit having at least two input ends, one of the input ends of said fourth amplifying circuit being connected to said other input end of said first amplifying circuit or said other input end of said second amplifying circuit, the other input and an output of said fourth amplifying circuit being connected together, and said output of said fourth amplifying circuit and said electrode being connected together.

21. A magnetic recording-reproducing circuit according to claim 1, wherein an IC chip including said amplifying circuits is mounted on a chip-on-board.

* * * * *

UNITED STATES PATENT AND TRADEMARK OFFICE
CERTIFICATE OF CORRECTION

PATENT NO. : 5,416,545
DATED : May 16, 1995
INVENTOR(S) : Kazuhiro IZUKAWA

It is certified that error appears in the above-indentified patent and that said Letters Patent is hereby corrected as shown below:

ON THE COVER PAGE, item [56]

UNDER "U.S. PATENT DOCUMENTS"

"5,191,435   3/1993   Tsunerawa et al." should read
--5,191,435   3/1993   Tsunekawa et al.--.

IN THE DRAWINGS:

FIGURE 14

"ANALOGUE" should read --ANALOG--.

FIGURE 15

"ANALOGUE" should read --ANALOG--.

FIGURE 17

"ANALOGUE" should read --ANALOG--.

UNITED STATES PATENT AND TRADEMARK OFFICE
CERTIFICATE OF CORRECTION

PATENT NO. : 5,416,545
DATED : May 16, 1995
INVENTOR(S) : Kazuhiro IZUKAWA

It is certified that error appears in the above-indentified patent and that said Letters Patent is hereby corrected as shown below:

IN THE DRAWINGS:

FIGURE 18

"ANALOGUE" should read --ANALOG--.

FIGURE 20

"ANALOGUE" (three occurrences) should read --ANALOG--.

FIGURE 21

"ANALOGUE" should read --ANALOG--.

COLUMN 5:

Line 21, "compares" should read --compare--.

Signed and Sealed this

Nineteenth Day of September, 1995

Attest:

BRUCE LEHMAN

Attesting Officer

Commissioner of Patents and Trademarks